(12) United States Patent
Fujisawa et al.

(10) Patent No.: US 7,022,394 B2
(45) Date of Patent: Apr. 4, 2006

(54) FASTENER STRIP WITH DISCRETE MAGNETICALLY ATTRACTABLE AREA, AND METHOD AND APPARATUS OF MAKING SAME

(75) Inventors: Nobuo Fujisawa, Macon, GA (US); Craig Jay Graham, Eastman, GA (US); Tsuyoshi Minato, Macon, GA (US); Ryuichi Murasaki, Toyama-ken (JP); Mitsuru Akeno, Toyama-ken (JP)

(73) Assignee: YKK Corporation, Tokyo (JP)

( * ) Notice: Subject to any disclaimer, the term of this patent is extended or adjusted under 35 U.S.C. 154(b) by 317 days.

(21) Appl. No.: 09/971,512

(22) Filed: Oct. 5, 2001

(65) Prior Publication Data

US 2002/0164449 A1 Nov. 7, 2002

Related U.S. Application Data

(63) Continuation-in-part of application No. 09/848,977, filed on May 4, 2001, now abandoned.

(51) Int. Cl.
*B32B 3/06* (2006.01)
(52) U.S. Cl. .......................... 428/99; 428/100; 428/119; 428/120; 428/900; 24/442
(58) Field of Classification Search .................. 428/99, 428/100, 900, 119, 120; 24/442
See application file for complete search history.

(56) References Cited

U.S. PATENT DOCUMENTS

| | | | |
|---|---|---|---|
| 3,408,705 A | 11/1968 | Kayser | |
| 4,563,380 A | 1/1986 | Black et al. | |
| 4,673,542 A * | 6/1987 | Wigner et al. | 264/46.7 |
| 4,693,921 A | 9/1987 | Billarant et al. | |
| 4,710,414 A | 12/1987 | Northrup et al. | |
| 4,784,890 A | 11/1988 | Black | |
| 4,849,272 A | 7/1989 | Haney et al. | |
| 5,061,540 A | 10/1991 | Cripps et al. | |
| 5,067,210 A | 11/1991 | Keyaki | |
| 5,500,268 A | 3/1996 | Billarant | |
| 5,540,970 A * | 7/1996 | Banfield et al. | 428/100 |
| 5,614,045 A | 3/1997 | Billarant | |
| 5,688,576 A | 11/1997 | Ohno et al. | |
| 5,725,928 A | 3/1998 | Kenney et al. | |
| 5,766,385 A | 6/1998 | Pollard et al. | |

(Continued)

OTHER PUBLICATIONS

Webster's Disctionary, 1984; p. 1022; definition of the term "row".*

*Primary Examiner*—Alexander S. Thomas
(74) *Attorney, Agent, or Firm*—Finnegan, Henderson, Farabow, Garrett & Dunner, L.L.P.

(57) ABSTRACT

The present invention provides a fastener strip having magnetically attractable particles which are not located across the entire volume of the strip, but rather are incorporated in a discrete, distinct area of the strip. The fastener strip has a base and many hook pieces which rise from a fastening surface of the base. One embodiment has a magnetically attractable body in a row which rises from the surface of the base and is located along a substantially center line of the fastener strip. The magnetically attractable particles are incorporated in the magnetically attractable body and a part of the base located below the magnetically attractable body, and the magnetically attractable particles are not dispersed across the whole area of the base. A method of manufacturing such a strip is also described here.

1 Claim, 25 Drawing Sheets

U.S. PATENT DOCUMENTS

| | | |
|---|---|---|
| 5,766,723 A | 6/1998 | Oborny et al. |
| 5,900,303 A | 5/1999 | Billarant |
| 5,932,311 A | 8/1999 | Kenney et al. |
| 5,945,193 A | 8/1999 | Pollard et al. |
| 6,460,230 B1 * | 10/2002 | Shimamura et al. .......... 24/452 |
| 6,537,643 B1 * | 3/2003 | Poulakis ..................... 428/100 |
| 6,596,371 B1 * | 7/2003 | Billarant ............... 428/99 |
| 6,720,059 B1 * | 4/2004 | Fujisawa et al. ............ 428/100 |

* cited by examiner

FASTENER STRIP WITH DISCRETE MAGNETICALLY ATTRACTABLE AREA, AND METHOD AND APPARATUS OF MAKING SAME

CROSS-REFERENCES TO RELATED APPLICATIONS

This application is a continuation-in-part of U.S. patent application Ser. No. 09/848,977 filed May 4, 2001 abandoned.

BACKGROUND

1. Field of the Invention

This invention is in the area of touch fastening devices, specifically a fastener strip with magnetically attractable bodies that are incorporated into discrete, individually distinct areas of the strip-rather than being distributed generally throughout the volume of the strip. A process for manufacturing such a strip is also described.

2. Description of the Related Art

It can be appreciated that a seat for a vehicle or the like is configured by attaching a superficial skin member on a surface of a cushion body. In order that a person sitting on the seat can maintain a seated posture and not tire even if he or she is sitting for a long time, a structure having a concave form is employed. In a seat having such a concave form, in order to prevent the superficial skin member from floating from the cushion body at the concave portion, as shown in FIG. 34, a foam molded article with a fastener strip attached to the concave portion is used as the cushion body. The fastener strip which is attached integrally to the cushion body and a mating fastener strip attached on a rear surface of the superficial skin member are adhesively engaged, so as to prevent the floating of the superficial skin member.

FIG. 9 shows a production example of a cushion body, in which a fastener strip is attached to the surface of a foam molded article in an integrated manner. The cushion body is manufactured by mounting the fastener strip in a mold with the fastening element side face-down, injecting a foam resin material into the mold, and foaming the foam resin material to form the cushion body.

As a method of fixing the fastener strip on the surface of the mold, a magnetically attractable body is generally provided on the fastener strip so as to fix the fastener strip to a magnet disposed in the mold. The magnetically attractable components have taken various forms, including metal staples, steel strips or shims, wire, porous metal webs or woven screen, and magnetically attractable particles.

U.S. Pat. No. 5,500,268, for example, discloses magnetically attractable particles which are incorporated into a foam seal also used to prevent fouling of the fastening elements during molding. U.S. Pat. Nos. 4,563,380; 4,710,414 and 4,784,890 describe the use of magnetically able particles which are mixed into the adhesive used to attach together various elements of the fastener strip, such as an anchor layer or a backing layer. U.S. Pat. No. 5,540,970 discloses a fastener strip having magnetically attractable particles embedded in an encasement which surrounds the hooks and thus prevents fouling, this encasement is then removed after the completion of the molding process.

Additionally, U.S. Pat. No. 5,945,193 describes a porous metal web or woven screen which is embedded into the back of the fastener base, or into a backing or substrate layer attached to the base.

As additional known examples, a magnetically attractable body can disposed on the side of the fastener strip; a soft magnetically attractable tape can be provided on a film to prevent foam resin from invading the fastening element surface upon foam-molding (Japanese Patent Application Laid-Open No. 4-109904); a thin steel strip can be clipped between the fastener strip and a lining (U.S. Pat. No. 4,673,542); many magnetically attractable members can be disposed adjacent to the edges of the opposite sides of the base of the fastener strip (U.S. Pat. No. 5,654,070); the base of the fastener strip can include a magnetic deactivate substance which acts on a magnetic attractant (U.S. Pat. No. 5,725,928); or a porous magnetically attractable web can be embedded in the base of the fastener strip (U.S. Pat. No. 5,945,193).

A magnetically attractable body can also be provided substantially all over a surface of a fastener strip in order to improve the absorption power of a magnet in the mold (Japanese Patent Application Laid-pen No. 4-109904; U.S. Pat. No. 4,673,542; U.S. Pat. No. 5,725,928; and U.S. Pat. No. 5,945,193), Or many magnetically attractable members can be disposed adjacent to the edges of the opposite sides of a base of a fastener strip (U.S. Pat. No. 5,654,070).

Further, U.S. Pat. Nos. 5,725,928 and 5,932,311 describe respectively a touch fastener, and a process of making the same, wherein the magnetically attractable particles a incorporated into the entire hook and base layer, or into an entire substrate layer that is coextruded with the hook and base layer. This is accomplished by premixing ferromagnetic material into the resin stream feeding the entire extruder. U.S. Pat No. 5,766,723 similarly discusses a fastener assembly wherein magnetically attractable particles are incorporated into the entire hook and base layer, or into an entire backing layer which is later attached to the hook and base layer.

The prior art of the previous paragraph has a major disadvantage, however, in that the magnetically attractable particles are mixed into the resin that forms the entire hook and base layer of the fastener strip, and/or the entire substrate layer if a substrate layer is used. Consequently, the magnetically attractable particles are present throughout the entire volume of the base and/or substrate, rather than being present in only those areas where magnetic attraction is desired. This process is wasteful, because it uses more magnetically attractable particles than might otherwise be needed. To the extent that magnetically attractable particles in the resin can affect other properties of the fastener strip, it can also degrade performance.

Conventional fastener strips have mainly emphasized strengthening of the magnetic force, and this approach has significant disadvantages. When such a fastener strip is initially placed on a mold, the fastener strip is immediately attracted and fixed on that position. The strip is difficult to reposition if such repositioning is needed. As a rest, these fastener strips need to be repositioned by hand, one by one. It thus takes an unacceptably long time to position the fastener strips in the mold.

Thus it can be seen that a fastener strip having magnetically attractable particles incorporated into the fastener strip only in discrete, targeted areas, and a manufacturing process for such a strip, would have significant advantages over the prior art. Accordingly, several objects and advantages of the invention are:

The location of the magnetically attractable bodies can be precisely targeted within the base, within any member unitarily molded with the base, or within a substrate layer—the bodies need not be distributed across the extent of the fastener strip. As just one example, magnetically attractable particles can be incorporated only into those portions of the base that underlie foam or other types of side seals, such that the magnetic force acts only on the sides of the strip.

As another advantage, magnetically attractable particles or long magnetically attractable bodies can be incorporated only along the longitudinal center of the strip, which makes it easier to align the strip in the mold. Generally, when a fastener strip having a narrow and long magnetically attractable body is mounted in a magnetic field generated from a magnet, the magnetically-charged ends of the fastener strip naturally align with the oppositely-charged poles of the mold magnet. It is thus easier to quickly and correctly position the fastener strip in a metal mold.

The process of the invention makes it faster and easier to purge resin containing magnetically attractable particles from the extruder and other equipment. It is thus easier to cycle between extruding strips with magnetically attractable particles and those without, using the same equipment, because the entire extruder does not have to be cleaned of magnetically attractable particles. Instead, only that portion or portions through which magnetically attractable particles have traveled must be cleaned. The line or channel which introduces the magnetically attractable particles can even be turned off or on if desired. It is thereby possible to increase flexibility and reduce cycle times in the manufacturing process.

Incorporating magnetically attractable particles or magnetically attractable bodies only where needed lowers the cost of the fastener strip, by reducing waste and cutting equipment cleanup time.

To the extent that magnetically attractable particles in the resin can adversely affect other properties of the fastener strip, the invention allows one to limit those effects to specifically defined areas.

Further objects and advantages of the invention will become apparent from a consideration of the drawings and ensuing description.

SUMMARY

The invention is a fastener strip with magnetically attractable bodies that are contained in discrete, individually distinct areas of the strip—rather than being distributed generally throughout the volume of the strip. A process for manufacturing such a strip is also described.

The basic structure of the present invention is a fastening device that can be magnetically secured to an object, comprising a base; at least one fastening element carried on the base; and magnetically attractable bodies arranged within a discrete area of the base, or within a discrete area comprising at least one integrally molded member carried on the base.

The magnetically attractable body is not dispersed over the entire area of the base, but rather is located within a discrete, distinct area of the base, in order to make optimal use of the magnetic attraction force and prevent unnecessary use of the magnetically attractable material.

It is preferable that the magnetically attractable body be located in a discrete area of the base along its longitudinal direction. Further, it is more preferable that the magnetically attractable body is located in a discrete area of the base along a substantially longitudinal center thereof or that the magnetically attractable body be located in a discrete area of the base along a longitudinal side thereof since this makes it easier to properly align the fastener strip upon positioning it on the mold.

Further, it is preferable that the magnetically attractable body have a narrow shape which is elongated in the longitudinal direction of the base and that the magnetically attractable body have sufficient magnetism to bring the longitudinal opposite ends of the fastener strip into line with the directions of the opposite poles of a magnet which is located on a predetermined position of the mold.

Generally, if a narrow and long magnetically attractable body is located in a magnetic field generated by a magnet, the magnetically attractable body is magnetized by this magnetic field. Further, on the longitudinal opposite ends of the magnetized magnetically attractable body, a plus magnetic pole and a negative magnetic pole are generated, respectively. In this case, when the magnetic flux density of the magnet is defined as H, the magnetic poles at the opposite ends of this magnetically attractable body have the same strength and its strength is defined as m, the force of $F=mH$ acts on the opposite ends of this magnetically attractable body, respectively. This moving force acts on the magnetically attractable body to align it in the directions of the opposite magnetic poles of the magnet. Further, the magnetism of this magnetically attractable body is attracted to the vicinity of the center of the opposite magnetic poles of the magnet.

In other words, if a fastener strip having a narrow and long magnetically attractable body is mounted in a magnetic field, which is generated by a magnet, as described above, the opposite ends in a longitudinal direction of the fastener strip align with the opposite poles of the magnet.

In contrast, if the long magnetically attractable body is not narrow but wide, and a fastener strip having this wide magnetically attractable body is located on a magnet with the longitudinal direction of the magnetically attractable body inclined with respect to the opposite magnetic poles of the magnet, the fastener strip will remain in an inclined, "crooked" position with respect to the poles of the magnet, and will not naturally align itself in a straight, correct manner.

Although the aligning force acting on a long and wide magnetically attractable body is the same as that acting on a long and narrow magnetically attractable body, the volume of the movement of the long and wide magnetically attractable body, towards alignment, is smaller than that of the long and narrow magnetically attractable body. Therefore, the aligning force acting on the wide magnetically attractable body is not sufficient to naturally align the ends of the wide magnetically attractable body with the directions of the opposite magnetic poles of the magnet.

In the present invention, the above described phenomenon generated by the long and narrow magnetically attractable body and the magnet is applied to the fastener strip. By providing a continuous narrow magnetically attractable body along the longitudinal direction of the fastener strip base and mounting the fastener strip in the vicinity of a predetermined mounting position on the mold, it is possible to use the above phenomenon to position and fix the fastener strip in the desired position, even if the fastener strip is initially placed without taking care to have a close positional relationship between the longitudinal direction of the fastener strip base and the positions of the opposite magnetically attractable poles of the magnet.

The width of the narrow magnetically attractable body can vary depending on the size of the fastener strip and the strength of the magnetic field of the magnet located in the mold. As long as the force, which acts on this magnetically attractable body by the strength of the magnetic pole of the opposite sides of the magnetically attractable body generated by this magnet and the magnetic flux density of this magnet, can be set to a volume sufficient to align the opposite ends in the longitudinal direction of the fastener strip with the directions of the opposite poles of the magnet, it is possible to set an arbitrary width of the fastener strip.

The magnetically attractable body having a narrow shape elongated in the longitudinal direction of the fastener strip base may be formed in a shape that is continuous in the longitudinal direction. Alternatively, the magnetically attractable body may also be formed in a shape that is discontinuous in the longitudinal direction. Both the magnetically attractable body having a shape that is continuous in this longitudinal direction and the magnetically attractable body having a shape that is discontinuous in this longitudinal direction can function as a magnetically attractable body which exhibits the above described phenomenon.

Particularly, if the magnetically attractable body is located in the center of the base or on the side of the base along the longitudinal direction, it is possible to place the attraction force between the magnetically attractable body and the magnet at the center of the fastener strip, so that it becomes possible to more strongly align the opposite ends of the fastener strip with the directions of the opposite poles of this magnet.

It is preferable that the magnetically attractable body be configured with at least one row of synthetic resin protrusion in which magnetically attractable particles are mixed, and that a surface of said protrusion be covered with a synthetic resin material which is the same as that of the base. With this feature, even when the resin used for the magnetically attractable body and the resin used for the fastener strip have poor affinity, it is possible to avoid separation of the protrusion from the rest of the fastener strip.

The foregoing magnetically attractable body may be located on the base itself, or the magnetically attractable body may be formed as at least one row of synthetic resin protrusion including a magnetically attractable material formed on the surface of the base.

In this case, the magnetically attractable material to be included in the synthetic resin protrusion may be magnetically attractable particles mixed in the synthetic resin or added to the synthetic resin, or it may be a magnetically attractable metal wire, a magnetically attractable tape, a long magnetically attractable material such as a textile fabric woven from the synthetic resin mixed with a metal fiber and magnetically attractable particles, or a non-woven fabric.

The synthetic resin protrusion may be formed to be continuous in the longitudinal direction of the base; however, it may also form valley portions along the longitudinal direction of the base at predetermined intervals. If the valley portions at predetermined intervals are formed along the longitudinal direction of the base, the protrusion can be easily bent at the valley portions, so that it becomes possible to make the fastener strip flexible.

In the case that the magnetically attractable material is made of magnetically attractable particles, magnetic powder such as iron, cobalt, nickel and the like is preferable. The magnetically attractable material may be produced by molding synthetic resin material mixed with magnetic powder when producing the protrusion, by applying a coating compound having the magnetic powder to the top of the protrusion after molding the protrusion, or by laminating a resin film including the magnetic powder onto the protrusion.

Alternatively, in the case that the magnetically attractable material is an elongated body, it is possible to locate that long magnetically attractable material along or within the protrusions. Particularly, the long magnetically attractable material can be placed so as to communicate through the interiors of the protrusions so that portions of the long magnetically attractable material are exposed at the valley portions. With such a structure, it becomes easy to integrate the protrusions made of the synthetic resin with the long magnetically attractable material, whose physical properties are different from those of the synthetic resin, and it is also possible to make the fastener strip flexible by way of the valley portions formed on the protrusions.

Alternatively, it is possible to fix the long magnetically attractable material on the top of the protrusions. According to this structure of the magnetically attractable body, when the fastener strip is mounted on the mold, the magnet disposed on the mold and the long magnetically attractable material are closely located. Therefore, it is possible to obtain a certain and strong magnetic attraction force.

The foregoing magnetically attractable body is also capable of being composed of a plurality of fastening elements, which include the magnetically attractable material and whose base portions are connected to each other. In the magnetically attractable body according to such a structure, it is not required to form a cavity for the protrusion separately. A plurality of fastening elements, which include the magnetically attractable material and which are located in a line in the longitudinal direction, function as a long magnetically attractable body upon mounting a fastener strip on the mold. Further, after the fastener strip is integrally formed on a surface of a foam molded article, the plurality of fastening elements also function as fastening elements, as originally intended.

The above described protrusions and the line of fastening elements, which function as a magnetically attractable body, are made of a thermoplastic resin which is molded on the base in an integral manner. Polyester, polyamide, polyolefin, polyvinyl chloride, polyurethane, polyolefin-elastomer, polyester-elastomer, polyamide-elastomer, polyisoprene, and a synthetic resin such as a resin composition including other thermoplastic polymers may be used as the thermoplastic resin.

Turning now to the process for making fastener strips with the above described structure, these strips are effectively manufactured by a manufacturing method and a manufacturing apparatus which are described below:

The method of manufacturing these fastener strips comprises the steps of (a) providing a magnetically attractable particulate material and (b) incorporating the magnetically attractable particulate material into a discrete area of a base layer of the touch fastening device or incorporating the magnetically attractable particulate material into a discrete area comprising at least one member which is formed in an integral manner and carried on the base layer of the touch fastening device. Further, the touch fastening device is capable of being magnetically fixed on an object.

The step for incorporating the magnetically attractable particulate material preferably includes a step to extrude the plastic resin tough an extruder and introduce the magnetically attractable particulate material through a different flow channel in the extruder. The foregoing different flow channel has an outlet, which is located substantially in the center of a front surface of the extruder. Then, the mixture of the plastic resin and the magnetically attractable particulate material is extruded to the base material of the fastener strip and the protrusions thereof through the different flow channel in the extruder.

Further, the procedure to incorporate the magnetically attractable particulate material includes a step to extrude the plastic resin through the extruder toward a die wheel adjacent to the extruder, and to extrude the magnetically attractable body through a different line. A magnetically attractable body molding cavity is preferably located substantially in the center of a periphery of the die wheel.

A preferable manufacturing apparatus to manufacture the above described fastener strip comprises a magnetically attractable body molding portion having a first extruding die having an extruding opening for extruding a molten synthetic resin, in which the magnetically attractable particles are mixed, and a first die wheel which is rotated around a horizontal axis and opposed to the extruding opening. The first die wheel has a magnetically attractable body molding cavity formed along a peripheral surface in its rotational direction. The apparatus further comprises a fastener strip molding portion having a second extruding die having an extruding opening for extruding a synthetic resin in a molten state, a second die wheel which is rotated around a horizontal axis and opposed to the extruding opening. The second die wheel has a fastener strip molding cavity formed along a peripheral surface in its rotational direction. The apparatus further comprises a magnetically attractable body guiding portion which is mounted upstream of the rotational direction of the second die wheel with respect to the second extruding die, to guide the magnetically attractable body molded in the magnetically attractable body molding portion to a predetermined position in the fastener strip molding cavity. The foregoing magnetically attractable body molding cavity includes concave portions for molding protrusions having a narrow shape which are continuous in a peripheral direction or which are intermittently spaced. The foregoing fastener strip molding cavity includes concave portions for molding fastening elements which are located at a predetermined pitch in a peripheral direction, and concave portions for accommodating a magnetically attractable body molded in the magnetically attractable body molding portion.

In other words, this pair of manufacturing apparatuses (the magnetically attractable body molding portion and the fastener strip molding portion) each comprise an extruding die having an extruding opening for extruding a molten synthetic resin and a die wheel having a molding cavity which is opposed to this extruding opening and is formed along the rotation around a horizontal axis and a peripheral surface in this rotational direction. One of these manufacturing apparatuses (the magnetically attractable body molding portion) molds the magnetically attractable body and the other manufacturing apparatus (the fastener strip molding portion) molds the rest of the fastener strip, such that the magnetically attractable body and the rest of the fastener strip are formed together in an integral manner.

The magnetically attractable body molding portion comprises a first exuding die having an extruding opening to extrude a molten synthetic resin material in which the magnetically attractable particles are mixed, and a first die wheel having a magnetically attractable body molding cavity which is rotated around a horizontal axis opposing to this extruding opening and is formed along a peripheral surface in the rotational direction.

The fastener strip molding portion comprises a second extruding die having an extruding opening to extrude a molten synthetic resin material, a second die wheel which is rotated around a horizontal axis and opposed to this extruding opening. The second die wheel has a fastener strip molding cavity formed along a peripheral surface in this rotational direction, and a magnetically attractable body guiding portion mounted upstream in a rotational direction of a second die wheel with respect to the second extruding die to guide the magnetically attractable body molded in the magnetically attractable body molding portion to a predetermined position in the fastener strip molding cavity.

In the first die wheel, a magnetically attractable body molding cavity is formed including concave portions for molding a protrusion having a narrow shape which are continuous in a peripheral direction or which are intermittently spaced. In the second die wheel, a fastener strip molding cavity is formed including concave portions for molding fastening elements provided at a predetermined pitch in a peripheral direction, and concave portions for accommodating a magnetically attractable body molded in the magnetically attractable body molding portion.

Between the extruding opening and the die wheel, a clearance is defined. With this clearance, the protrusions formed in the intermittently spaced concave protrusion-molding portions are molded continuously.

When using a fastener strip manufacturing apparatus with such a structure, the molten synthetic resin material, in which the magnetically attractable particles are mixed, is extruded from the first extruding opening and the synthetic resin material continuously fills the magnetically attractable body molding cavity as the first die wheel is rotated. After that, the magnetically attractable body is stripped off from the peripheral surface of the first die wheel. In the same way, the synthetic resin material in the molten state is extruded from the second extruding opening and these synthetic resin materials continuously fill the fastener strip molding cavity as the second die wheel is rotated. Simultaneously, via the magnetically attractable body guiding portion, the magnetically attractable body is continuously provided to the concave, magnetically attractable body-accommodating portions of the fastener strip molding cavity. After melting and attaching the synthetic resin material and the magnetically attractable body integrally, the completed fastener strip having fastening elements and including a magnetically attractable body with a narrow shape is stripped off from the second die wheel.

In other words, by filling the molten synthetic resin material, in which the magnetically attractable particles are mixed, in the magnetically attractable body molding cavity, a magnetically attractable body is formed as a protrusion. The magnetically attractable body guiding portion continuously provides the magnetically attractable body to the fastener strip molding cavity, which is being simultaneously filled with synthetic resin material, so that the fastener strip having the magnetically attractable body is manufactured.

The magnetically attractable body molded in the first die wheel is wound by a reel or the like, and then, is unwound from this reel or the like, in order to provide the magnetically attractable body to the second die wheel. As a result, it is possible to continuously manufacture the fastener strip having the magnetically attractable body.

Alternatively, a magnetically attractable body molded in the first die wheel may be provided to the second die wheel not via a winding reel or the like but via the magnetically attractable body guiding portion so as to continuously manufacture the fastener strip having the magnetically attractable body. If a winding reel or the like is interposed between the first and second die wheels, a dancer roller may be provided between the rewinding reel and the second die wheel, and if a winding reel or the like is not interposed, a dancer roller may be provided between the second die wheel and the material guiding opening, so that it is possible to adjust the tension of the magnetically attractable body and prevent slack.

With respect to the cross section shape of the magnetically attractable body guiding portion, any cross section shape may be applicable if it is similar to the cross section of the magnetically attractable body and certainly guides the magnetically attractable body to the concave portions for accommodating the magnetically attractable body within the fastener strip molding cavity.

As another example of the manufacturing apparatus of the fastener strip, a magnetically attractable body molding portion is provided with a magnetically attractable material guiding portion mounted upstream in the rotational direction of a first die wheel with respect to the first extruding die, to guide the long magnetically attractable material to a predetermined part of the concave protrusion-molding portions of the magnetically attractable body molding cavity. The molten synthetic resin material is extruded from the first extruding die and fills the magnetically attractable body molding cavity formed in the first die wheel. Meanwhile, the long magnetically attractable body is separately guided via the magnetically attractable material guiding portion, and is introduced into the cavity for molding the magnetically attractable body. Then, the long magnetically attractable body is integrated with the molten resin filling the cavity for molding the magnetically attractable body, so that a long magnetically attractable body is formed. As in the above described method, in the case of this long magnetically attractable body also, the magnetically attractable body is continuously provided to the concave, magnetically attractable body-accommodating portions of the fastener strip molding cavity via the magnetically attractable body guiding portion. A fastener strip having fastening elements and including a magnetically attractable body with a narrow shape is thus molded.

The above described magnetically attractable material guiding portion may be also formed on the first extruding die. When the magnetically attractable material guiding portion which guides the long magnetically attractable material is formed on the first extruding die, a guiding front end of this magnetically attractable material guiding portion may be located in the vicinity of the concave protrusion-molding portions of the magnetically attractable body molding cavity. Therefore, it is possible to more certainly guide the long magnetically attractable material to a predetermined position.

The above described fastener strip manufacturing apparatus is provided with a pair of manufacturing machines, each comprised of an extruding die and a die wheel (a magnetically attractable body forming portion and a fastener strip forming portion). However, the fastener strip manufacturing apparatus can also comprise a single extruding die and die wheel set.

In other words, the fastener strip manufacturing apparatus can be provided with an extruding die having a pair of extruding openings to extrude the molten synthetic resin materials separately and a die wheel which rotates around a horizontal axis and is opposed to these extruding openings. The die wheel has a magnetically attractable body molding cavity and a fastener strip molding cavity formed along the peripheral surface of this rotational direction. The foregoing molding cavities include concave protrusion-molding portions with a narrow shape, which are continuous in a peripheral direction or which are intermittently spaced, and which comprise the magnetically attractable body molding cavity. The molding cavities also include concave portions for molding fastening elements, which are located at a predetermined pitch in a peripheral direction, and which comprise the fastener strip molding cavity. The foregoing extruding die is provided with the pair of extruding openings at an upper position and a lower position along the rotational direction of the die wheel. The foregoing upper extruding opening has a shape so as to extrude the molten synthetic resin material, in which the magnetically attractable particles are mixed, specifically to the magnetically attractable body molding cavity and the lower extruding opening has a shape so as to extrude the molten synthetic resin material specifically to the fastener strip molding cavity.

In other words, on the die wheel, the magnetically attractable body molding cavity and the fastener strip molding cavity are formed on the same peripheral surface. The molding surface includes the concave protrusion-molding portions with a narrow shape which are continuous in a peripheral direction or which are intermittently spaced, and also includes concave fastening element-molding portions located at a predetermined pitch in a peripheral direction.

Further, on the extruding die, a pair of extruding openings are formed on the upper and the lower positions along the rotational direction of the die wheel. In order to extrude the molten synthetic resin material, in which the magnetically attractable particles are mixed, into the magnetically attractable body molding cavity from the upper extruding opening, the upper extruding opening has a shape so as to continuously and specifically fill the magnetically attractable body molding cavity with molten synthetic resin. On the other hand, the lower extruding opening has a shape for extruding the molten synthetic resin specifically into the fastener strip molding cavity. By using this fastener strip manufacturing apparatus, it is possible to manufacture a fastener strip having the magnetically attractable body in one step.

When using this fastener strip manufacturing apparatus, the molten synthetic resin material, in which the magnetically attractable particles are mixed, is extruded from the upper extruding opening and the die wheel is rotated, so that the synthetic resin continuously fills the magnetically attractable body molding cavity. Meanwhile, the molten synthetic resin material is extruded from the lower extruding opening to continuously fill the fastener strip molding cavity, which is formed in the die wheel. By peeling off the fastener strip including fastening elements and the magnetically attractable body of a narrow shape from this die wheel, it is possible to continuously manufacture the fastener strip having the magnetically attractable body as a final product in one step.

Alternatively, according to the above described fastener strip manufacturing apparatus, in place of using molten magnetically attractable resin material to manufacture the magnetically attractable body, a guiding portion for long magnetically attractable material can be provided so that the long magnetically attractable material is continuously provided to a predetermined position within the magnetically attractable body molding cavity via this guiding portion so as to continuously manufacture a magnetically attractable body including the long magnetically attractable material. The guiding portion of the long magnetically attractable material can be defined to be formed in the extruding die. In this case, if a magnetically attractable material guiding portion to guide the long magnetically attractable material is formed in the extruding die, it is possible to locate a guiding front end portion of this magnetically attractable material guiding portion in the vicinity of the concave protrusion-molding portions of the magnetically attractable body molding cavity.

In summary, the molten synthetic resin material is extruded from the extruding opening of the extruding die, the die wheel is rotated to continuously fill the molding cavity with synthetic resin, and a fastener strip including magnetically attractable protrusions with a narrow shape and fastening elements is continuously manufactured. It is also possible to form the magnetically attractable body by performing laminate-processing to affix a layer containing magnetically attractable particles to at least the top surfaces of the protrusions or performing coating-processing to coat at least top surfaces of the protrusions with magnetically attractable particles.

The laminate-processing using a film or the like containing magnetically attractable particles or the coating-processing using a resin and coating material containing magnetically attractable particles can be performed only on the top surfaces of the protrusions or on the surfaces of the protrusions along a longitudinal direction of the base. Further, it is possible to perform the above described processing across an extended or even the whole area of the protrusions.

DESCRIPTION OF THE DRAWINGS

FIG. 3 is a top view of an alternative embodiment, wherein narrow rows of blocks, having magnetically attractable particles within, are located at opposing longitudinal sides of the fastener strip.

FIG. 4 is a top view of an alternative embodiment, with a center wall having magnetically attractable particles incorporated within.

DETAILED DESCRIPTION OF THE INVENTION

Figure 1:
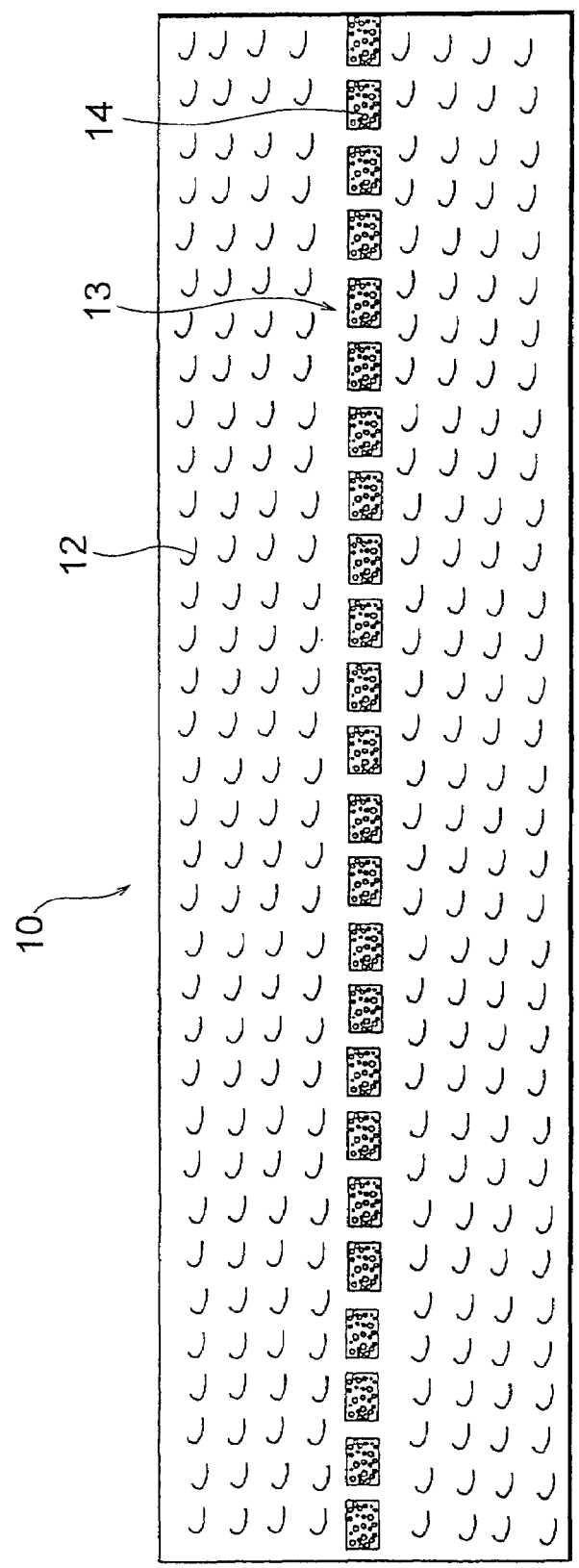
FIG. 1 is a top view of a fastener strip of the invention, showing a center row of blocks and the magnetically attractable particles within them.
Figure 2:
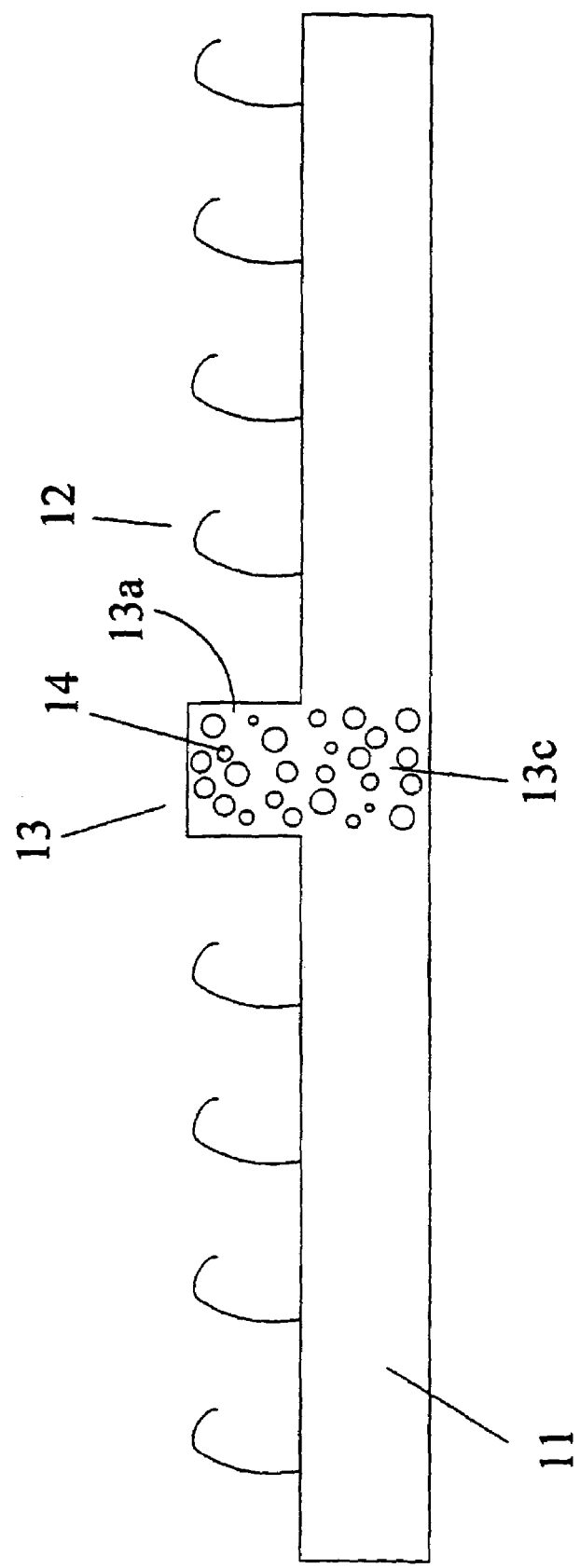
FIG. 2 is a cutaway end view of the fastener strip, illustrating the magnetically attractable particles within both the center blocks and the center of the base.

A list of reference numerals, which are used in the drawings, is as follows:

10: fastener strip
11: base
12: fastening element (hook piece)
13: magnetically attractable body
13a: protrusion
13b: valley portion
13c: base material portion
14: magnetically attractable particle
15: wall
16: barrier to prevent intrusion of molding material
16a: vertical sealing member
17: foam resin material
18: laminate layer
19: coating film 20: metal wire
21: magnetically attractable band material
22: long magnetically attractable material
24: resin
25: magnetically attractable resin
26: line
30: mold
30b: lower portion of mold
31: magnet
35: extruder
35a: primary nozzle
36: die wheel
36a: hook-shaped cavity
36b: magnetically attractable body molding cavity
37: supplementary particle reservoir
37a: supplementary particle channel
37b: supplementary particle nozzle
40: first extruding die
40a: extruding opening
40a-1: extruding nozzle portion
40a-2: concave portion
41: second extruding die
41a-1: extruding nozzle portion
42a-2: concave portion
45: first die wheel
45a: concave protrusion-molding portion
46: second die wheel
46a: fastener strip molding cavity (concave portion)
46b: concave portion for accommodating magnetically attractable body
47,48: magnetically attractable body guiding portion FIGS. 1 and 2 show a top view of a cutaway end view of a primary embodiment according to the present invention. A fastener strip 10 having an engagement surface comprising a base 11 and fastening elements 12 which rise from the base 1, further has a magnetically attractable body 13 which rises from a surface of the base 11 and which is located substantially along a center line of the fastener strip 10. The magnetically attractable body 13 is comprised of a row of magnetically attractable protrusions 13a made of a synthetic resin material, in which magnetically attractable particles 14 are mixed. In FIG. 1, protrusions 13a are block-like in shape. The foregoing magnetically attractable particles 14 are also mixed in a base material portion 13c of the base 11 below these protrusions 13a, and the magnetically attractable particles 14 are not dispersed across a whole of the base 11. Accordingly, the magnetically attractable body 13 comprises a continuous body in which valley portions 13b are formed between the protrusions 13a.

Figure 3:
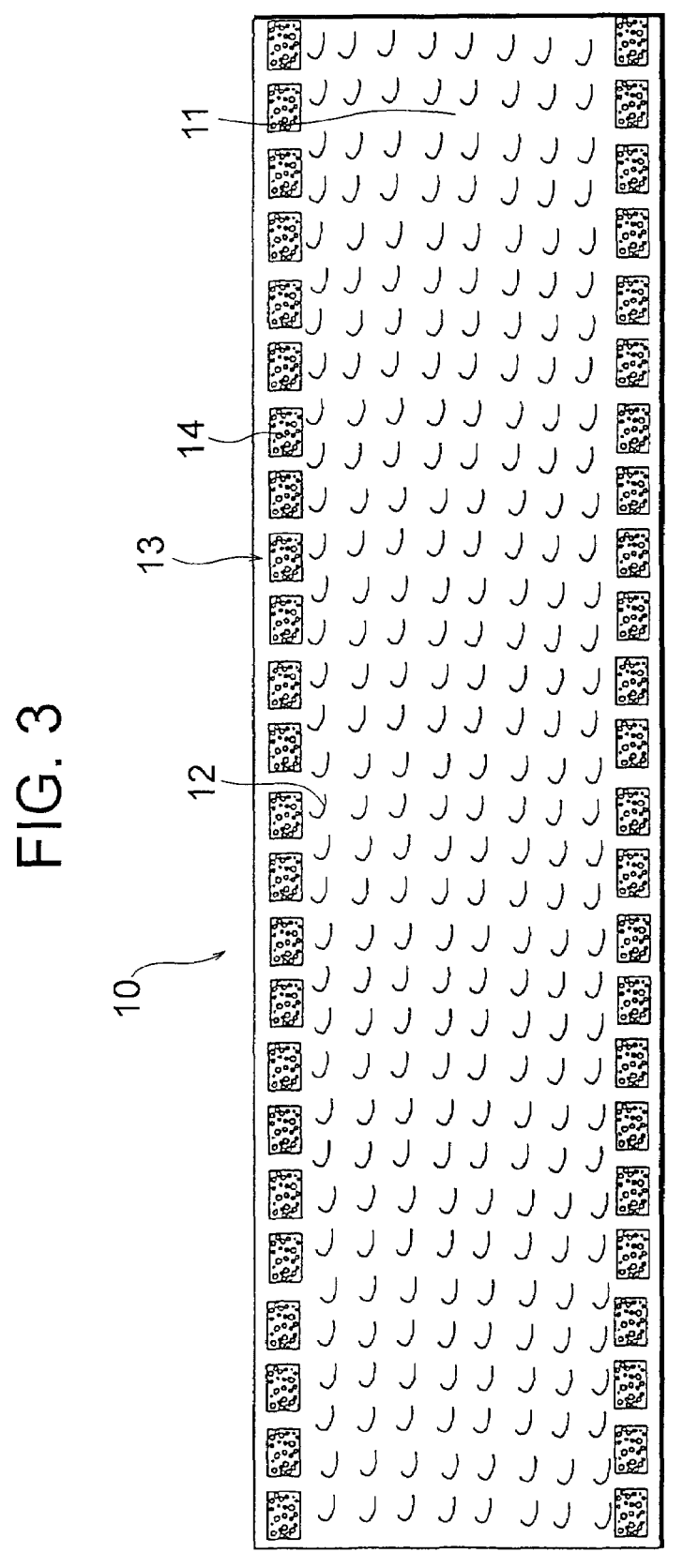
Figure 4:
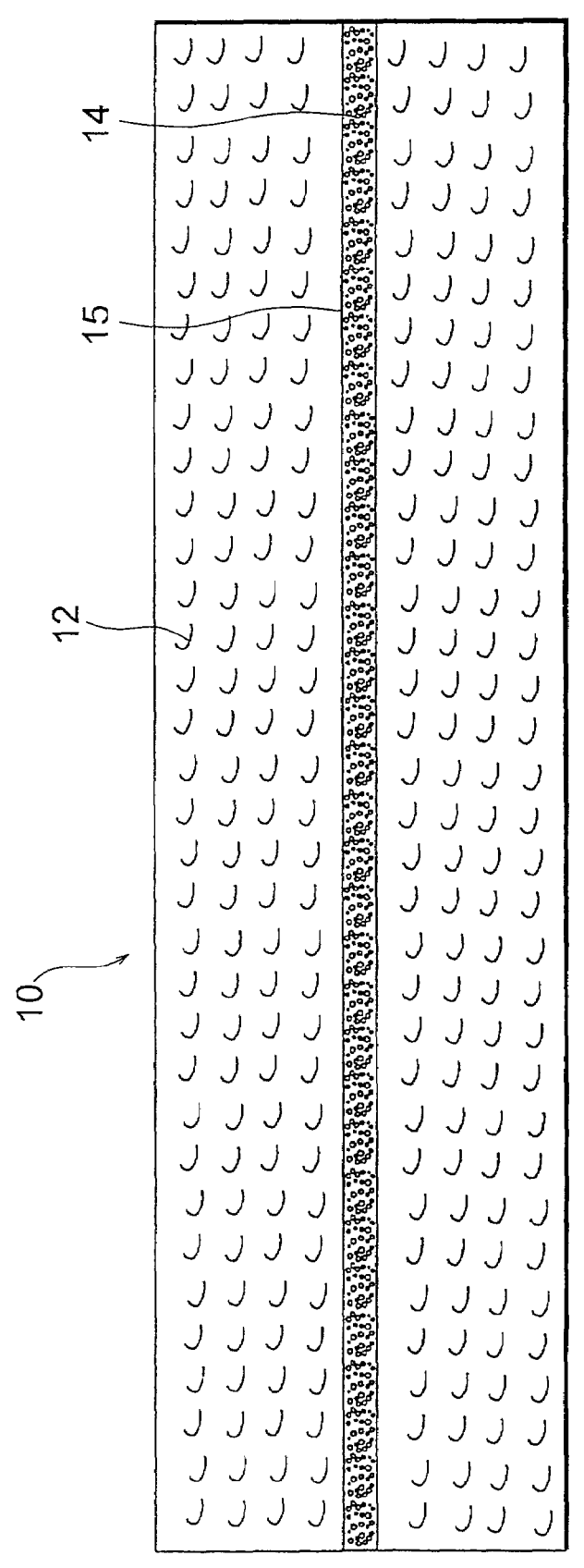

FIGS. 3 and 4 illustrate another embodiment according to the present invention. FIG. 3 is a top view of the fastener strip 10. A magnetically attractable body 13, having magnetically attractable particles 14 incorporated in a row of protrusions 13a, is located at each opposing longitudinal side of the fastener strip 10. FIG. 4 is a top view of the fastener strip 10 wherein a continuous wall 15, which contains magnetically attractable particles 14, rises from a surface of the base 11 and is located substantially along a center line of the fastener strip 10. In FIGS. 3 and 4, other portions are the same as the main embodiment according to the present invention.

FIGS. 5 through 8 specifically illustrate another typical embodiment according to the present invention. As shown in these drawings, the fastener strip 10 according to the present invention is provided with many fastening elements 12 on a surface of the base 11 except the opposite edge portions thereof. On the opposite edge portions thereof, barriers to prevent intrusion of molding material 16 are disposed, comprised of many vertical sealing members 16a located in a line along a longitudinal direction. The protrusions 13a of the magnetically attractable body 13 are located at even intervals along a longitudinal center line of the base 11, and the valley portions 13b are formed there between. It is possible to manufacture the barrier to prevent intrusion of molding material 16, the base 11, the fastening elements 12 and the protrusions 13a from a thermoplastic resin by integral molding.

Figure 5:
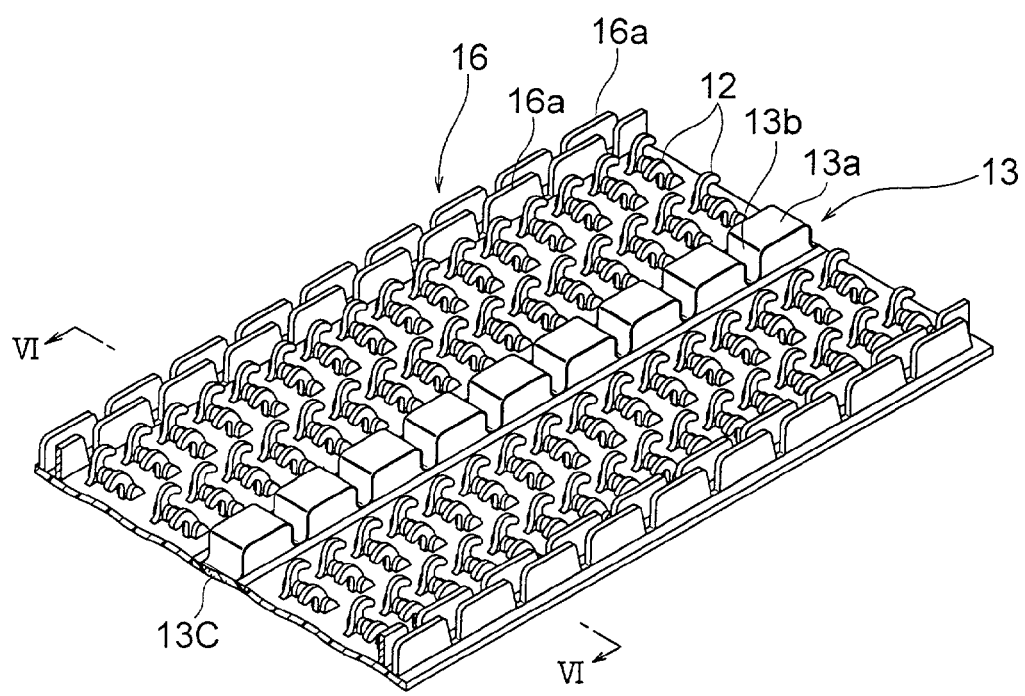
FIG. 5 is a perspective view of a fastener strip for illustrating an alternative embodiment according to the present invention
Figure 6:
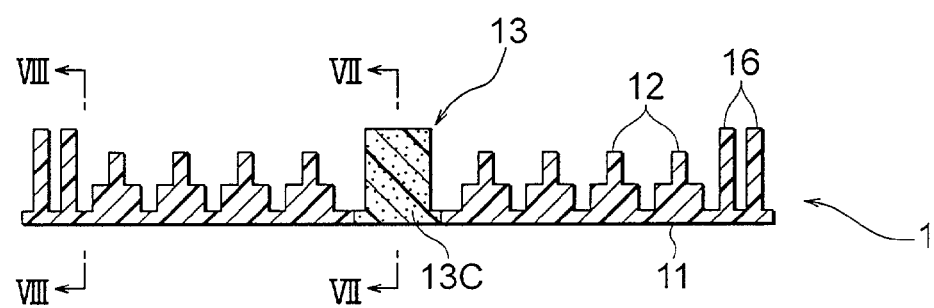
FIG. 6 is a cross sectional view along a line VI—VI in FIG. 5.
Figure 7:
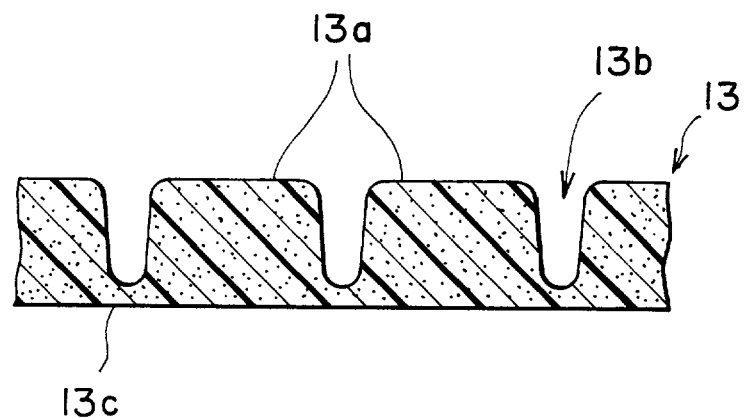
FIG. 7 is a cross sectional view along a line VII—VII in FIG. 6.

As shown in FIGS. 5 and 6, the protrusion 13a has the base material portion 13c on its base and it has a form of one continuous body by the base material portion 13c. The base material portion 13c and the protrusion 13a can be molded integrally from a thermoplastic resin in which magnetically attractable particles are mixed. Further, as shown in FIGS. 5 and 6, it is possible to form the barrier to prevent intrusion of molding material 16, comprising the plurality of vertical sealing members 16a, on the opposite edges of the fastener strip 10.

Figure 11:
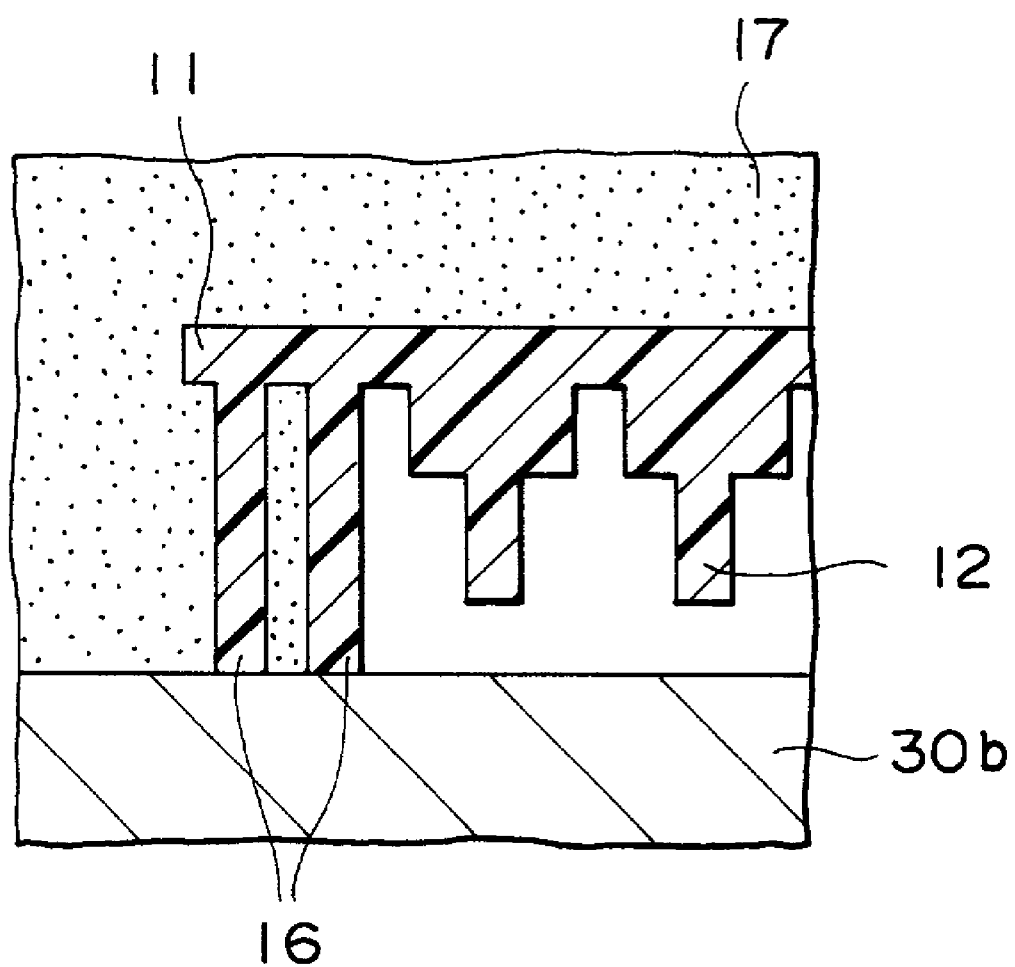
FIG. 11 is an detailed part cross sectional view illustrating a foam resin material that has been injected into the mold
Figure 12:
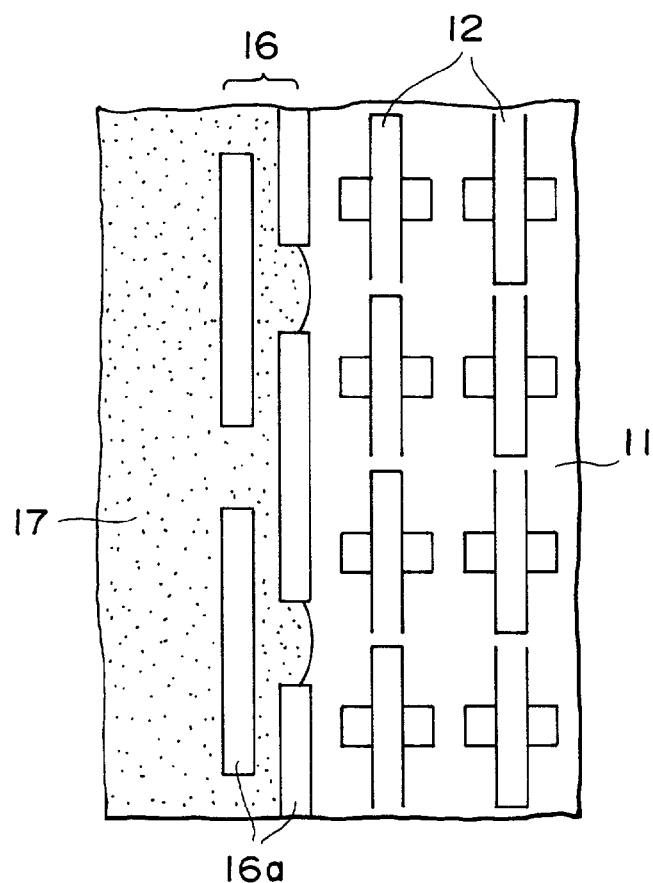
FIG. 12 is a partial plan view illustrating a foam resin material partially penetrating between vertical sealing members of a barrier to prevent intrusion of the foam resin material.

As shown in FIGS. 11 and 12, the vertical sealing members 16a prevent a foam resin material 17 from intruding among the fastening elements 12 of the fastener strip 10 upon foam molding. Also, the vertical sealing members 16a allow a portion of the foam resin material 17 to intrude toward the fastening elements 12 of the fastener strip 10 through the gaps between adjoining vertical sealing members 16a (see FIG. 8), and the vertical sealing members 16a are anchored by the intruded foam resin material 17 and the foam resin material 17 on the outside of the vertical sealing members 16a.

Figure 8:
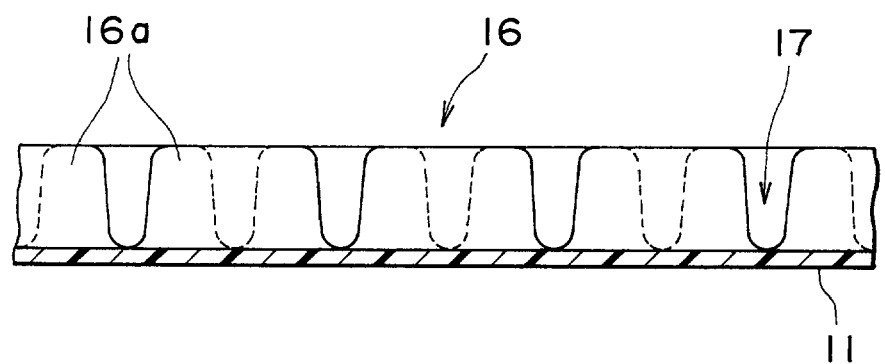
FIG. 8 is a cross sectional view along a line VIII—VIII in FIG. 6.

As shown in FIGS. 5 and 6, in the case that two rows of the barrier to prevent intrusion of molding material 16 are provided on each of the opposite edges of the fastener strip 10, if each pair of rows of the vertical sealing members 16a are staggered with respect to each other as shown in FIGS. 5 and 8, it is possible to strengthen the sealing function, in order to better prevent intrusion of foam resin material. In other words, the foam resin material 17 intrudes into the gaps between the outside vertical sealing members 16a, strikes against the inside vertical sealing members 16a, and surrounds the rear surface of the outside vertical sealing members 16a, so that the flow of the foam resin material 17 is changed. In order to prevent intrusion of the foam resin material 17, it is necessary that the height of the protrusion 13a is not more than the height of the vertical sealing member 16a. In the case that the barrier to prevent intrusion of the molding material 16 is continuous, the height of the protrusion 13a is also required to be not more than the height of the vertical sealing member 16a.

According to the present invention, the barrier to prevent intrusion of the molding material 16 is not always required. If such a barrier to prevent the intrusion of the molding material 16 is not provided, the effects of the present invention can still be realized. In place of the vertical sealing members 16a, any alternative barrier to prevent the intrusion of a molding resin may be provided along each of the opposite edges of the fastener strip 10.

Figure 9:
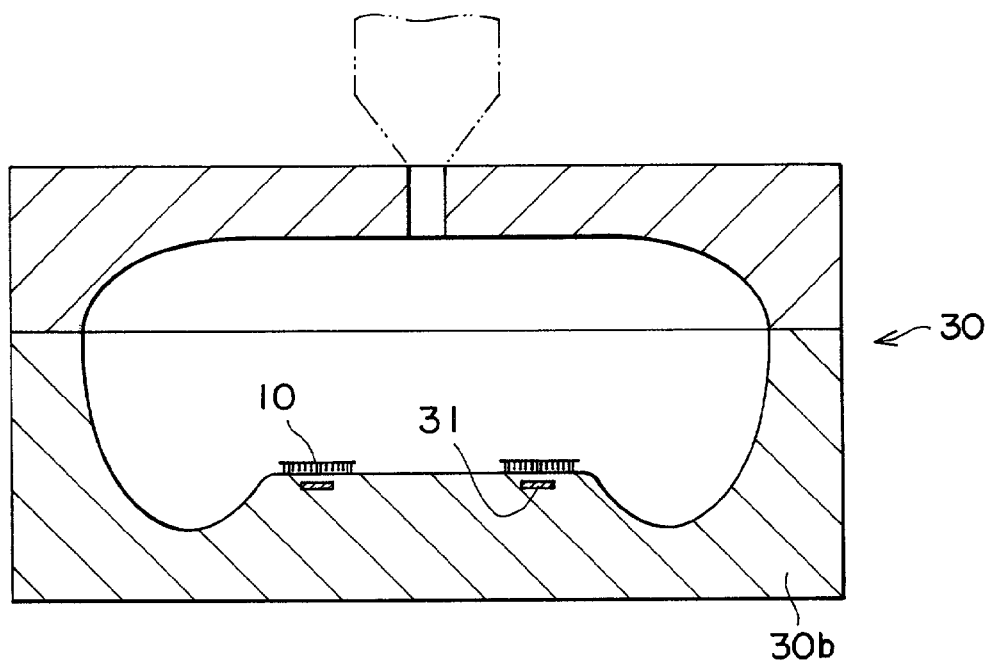
FIG. 9 is a cross sectional view illustrating a foam seat mold in which two fastener strips are mounted.
Figure 10:
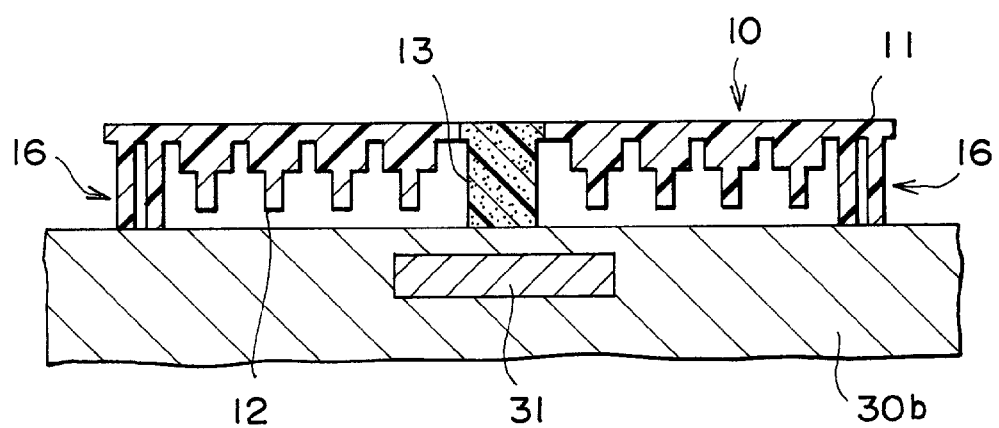
FIG. 10 is a detailed part cross sectional view illustrating a fastener strip mounted on a lower portion of the mold

FIGS. 9 through 12 illustrate an example of a mold for attaching the above described fastener strip 10 onto a foam molded article in an integral manner, and its molding mechanism. As shown in FIGS. 9 and 10, the magnetically attractable body 13 is magnetically attracted by a magnet 31 provided on the mold 30, so as to position and fix the fastener strip 10 in the mold 30. When the magnetically attractable body 13 is mounted above the magnet 31, a force acts on the magnetically attractable body 13 by the strength of the magnetic poles on the opposite ends of the magnetically attractable body generated by a magnetic field of the magnet 31, and the density of the magnetic flux, so that a force is generated which brings the opposing longitudinal edges of the fastener strip 10 having the magnetically attractable body 13 into line with the direction of the opposing magnetic poles. According to the present embodiment, it is important that the magnetically attractable body 13 have a narrow shape elongated in a longitudinal direction of the base 11 of the fastener strip 10, namely, the magnetically attractable body 13 should be shaped so that the magnetically attractable body 13 is capable of bringing the opposing longitudinal edges of the fastener strip 10 into line with the direction of the opposing magnetic poles.

If the fastener strip 10 is mounted within the mold 30 as shown in FIG. 9, the fastener strip 10 is fixed on a lower portion 30b of the mold 30, being magnetically attracted and aligned with the direction of the opposite magnetic poles by the effect of the protrusions 13a of the magnetically attractable body 13 and the magnet 31 provided on the lower portion 30b of the mold, as shown in FIG. 10. In other words, if the magnet 31 provided in the mold 30 is set in a desired direction necessary for mounting the fastener strip 10 in advance, it is possible to align the fastener strip 10 in a desired direction merely by placing the fastener strip 10 on the magnet 31. As shown in FIG. 10, the magnetic attraction closes any gap between vertical sealing members 16a and the surface of the lower portion 30b of the mold 30.

FIGS. 13 to 22 show modifications of the protrusion 13a and magnetically attractable body 13, and illustrate the structure of those modifications.

Figure 13:
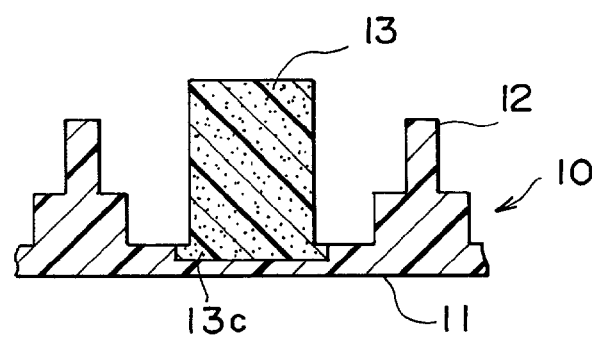
FIG. 13 is a cross sectional view for illustrating a modification of the magnetically attractable body.

FIG. 13 partially illustrates a structure such that the base material portion 13c and the protrusion 13a made of a thermoplastic resin mixed with the magnetically attractable particles 14 are integrally fixed on a surface of the base 11. The magnetically attractable body 13, comprising the protrusion 13a and the base material portion 13c, may be manufactured by fixing it on the base 11 after it is separately molded with other component parts of the fastener strip 10. Alternatively, the magnetically attractable body 13 comprising the protrusion 13a and the base material portion 13c may be continuously manufactured by combining other component parts of the fastener strip 10 with the magnetically attractable body 13 when manufacturing fastener strip 10.

Figure 14:
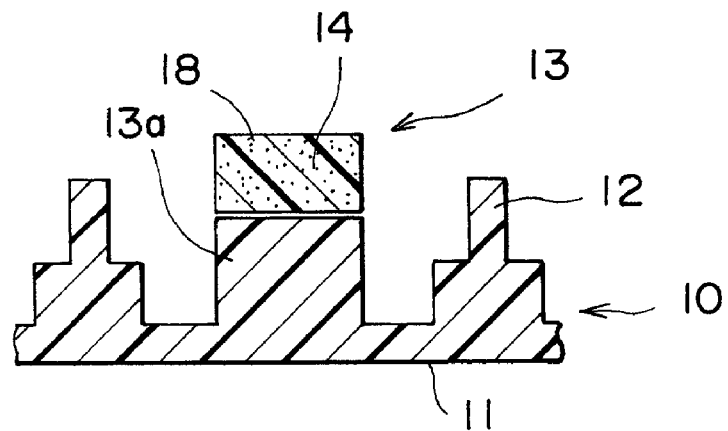
FIG. 14 is a cross sectional view for illustrating another modification of the magnetically attractable body.

FIG. 14 illustrates a part of a structure wherein a laminate layer 18 containing the magnetically attractable particles 14 is laminate-processed onto a top surface of the protrusion 13a which is integrally molded into the fastener strip 10. The laminate layer 18 needs to be of a thickness such that the magnetically attractable body 13 realizes the effect of the present invention FIG. 15 illustrates a structure such that a coating film 19 containing the magnetically attractable particles 14 is formed in place of the laminate layer 18 made of the synthetic resin containing the magnetically attractable particles 14.

Figure 15:
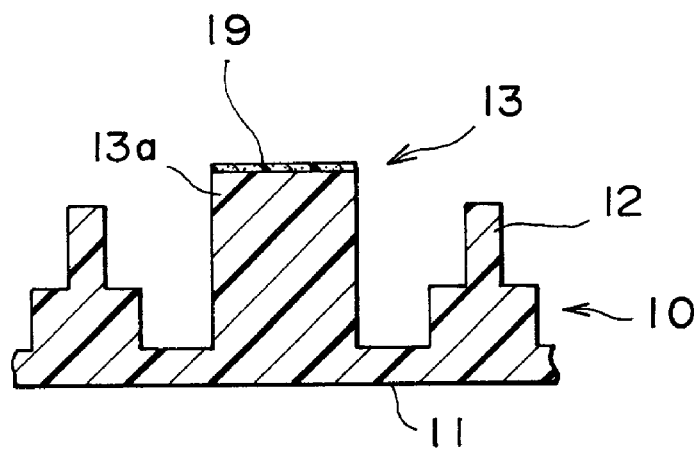
FIG. 15 is a cross sectional view for illustrating a still another modification of the magnetically attractable body.

In FIGS. 14 and 15, the magnetically attractable laminate layer 18 or the magnetically attractable coating film 19 may be formed only at the top surface of the magnetically attractable body 13, along a longitudinal direction. Alternatively, the magnetically attractable laminate layer 18 or the magnetically attractable coating film 19 may be formed over all surfaces of the protrusions 13a. Further, the magnetically attractable laminate layer 18 or the magnetically attractable coating film 19 may be formed at only the front ends of the protrusions 13a.

Figure 16:
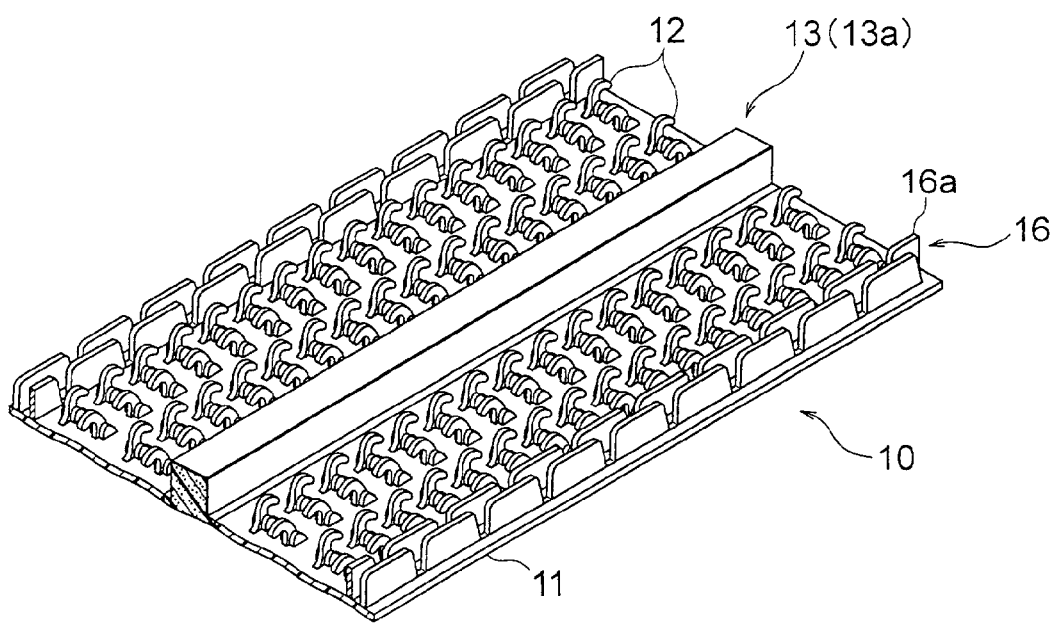
FIG. 16 is a perspective view for illustrating another embodiment of a fastener strip.

FIG. 16 illustrates an example of a protrusion 13a having a continuous shape without a valley portion, as a magnetically attractable body 13. The magnetically attractable body 13 may be formed by using a thermoplastic resin material, in which the magnetically attractable particles 14 are mixed. Alternatively, as shown in FIGS. 14 and 15, the laminate layer 18 may be formed or the magnetically attractable coating film 19 may be formed.

Figure 17:
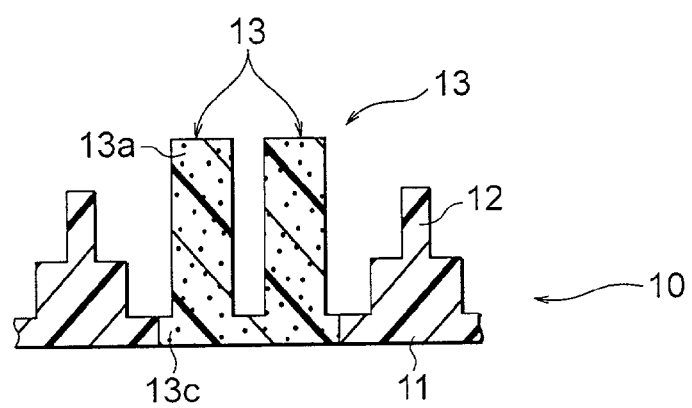
FIG. 17 is a cross sectional view for illustrating a modification of the magnetically attractable body.

FIG. 17 illustrates a structure wherein two rows of the protrusions 13a as the magnetically attractable body 13 are formed. In this case, the two rows of protrusions 13a are connected with the base material portion 13c at the bottom. However, the two rows of protrusions 13a may be structured to be separate and not connected. A thermoplastic resin, in which the magnetically attractable particles 14 are mixed, may be used to form the magnetically attractable body 13 comprising protrusions 13a in an integrated manner. Further, the laminate layer 18 containing the magnetically attractable particles 14 may be formed or the magnetically attractable coating film 19 may be formed. In this case, the above described various methods to form the magnetically attractable body 13 can be appropriately employed.

Figure 18:
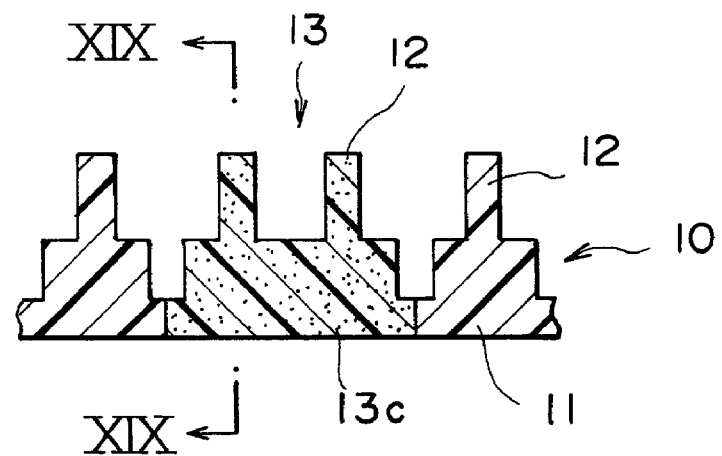
FIG. 18 is a cross sectional view for illustrating a modification of the magnetically attractable body.
Figure 19:
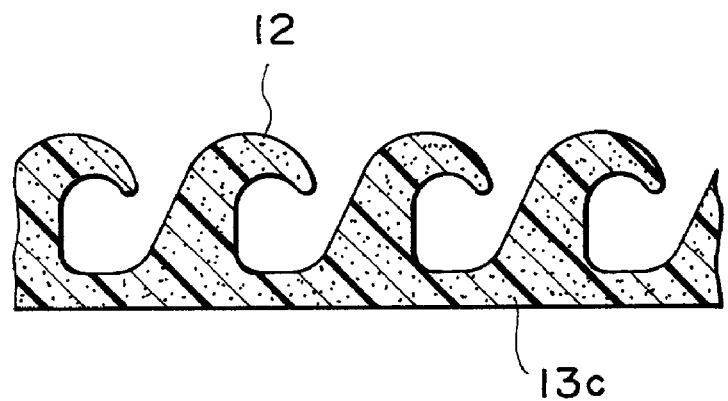
FIG. 19 is a cross sectional view along a line XIX—XIX in FIG. 18.

FIG. 18 illustrates a structure such that, in place of the protrusion 13a, some of the fastening elements 12 are formed of magnetically attractable material so as to form the magnetically attractable body 13. In this case, as shown in FIG. 19, the bases of the two rows of the fastening elements 12 formed of magnetically attractable material are connected, so as not to disperse the magnetic force, and the two rows of the fastening elements 12 are structured as a one-piece magnetically attractable body 13 having a long and narrow shape. Alternatively, the bases of the fastening elements 12 need not be connected. Further, the number of fastening element rows may be two or more than two.

The fastening element row, in which the magnetically attractable particles 14 are mixed, functions as a magnetically attractable body 13 and inherently as engaging fastening elements 12.

Figure 20:
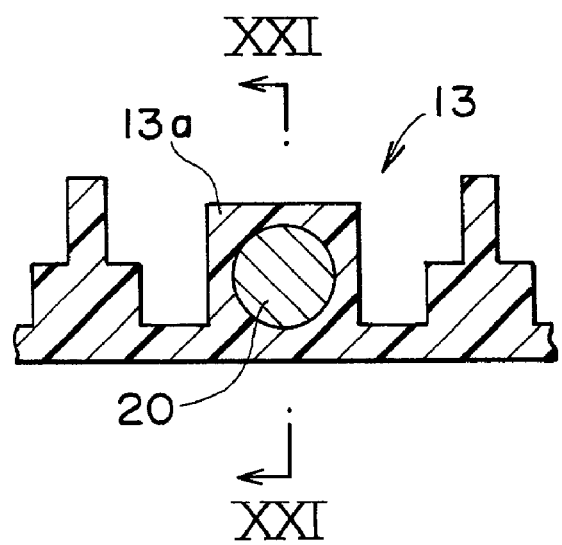
FIG. 20 is a cross sectional view for illustrating still another modification of the magnetically attractable body.
Figure 21:
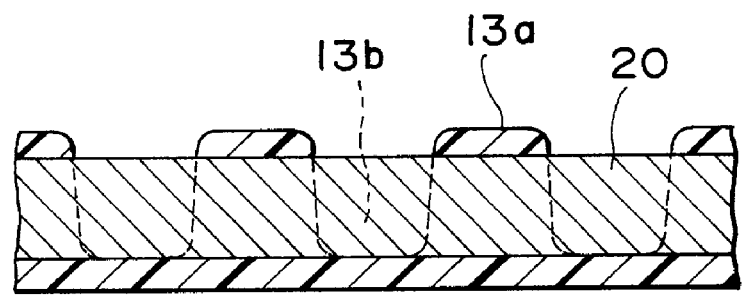
FIG. 21 is a cross sectional view along a line XXI—XXI in FIG. 20.

FIG. 20 illustrates a structure wherein long magnetically attractable material 22, in the form of a metal wire 20, constitutes a magnetically attractable body 13 located along a continuous row of protrusions 13a. According to this example, the metal wire 20 having a circular cross section is located within the protrusion 13a. However, in place of this, the metal wire 20 having a rectangular cross section or a metal wire 20 having other various form cross sections may be employed. Alternatively, the metal wire 20 may be mounted on a front end of the protrusion 13a. Alternatively, as shown in FIG. 21, a structure such that the metal wire 20 is exposed in the valley portion 13b formed between non-continuous protrusions 13a may be employed.

Figure 22:
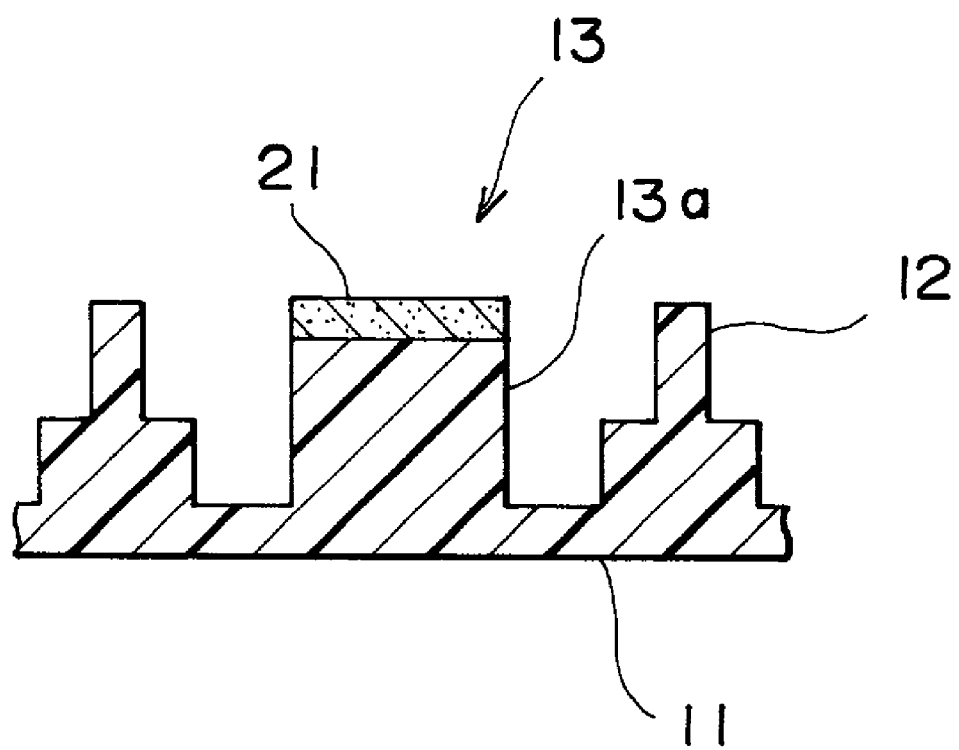
FIG. 22 is a cross sectional view for illustrating a still another modification of the magnetically attractable body.

FIG. 22 illustrates an example wherein long magnetically attractable material 22, comprising magnetically attractable band material 21, is located along the top surfaces of the protrusions 13a. Magnetically attractable band material 21 is composed of, for example, a magnetically attractable tape, a woven and knitted fabric made of synthetic resin fiber in which the metal fiber and the metal particle are mixed, or a non woven fabric formed by the metal fiber. Alternatively, the magnetically attractable band material 21 also may be located within the protrusions 13a.

The magnetically attractable band material 21 is adhesively fixed on the top surfaces of the protrusions 13a, or the molten synthetic resin material is intruded between the gaps of the fibers to surround the fibers upon molding the protrusions 13a, so that the magnetically attractable band material 21 is fixed. Alternatively, in place of the magnetically attractable band material 21, a magnetically attractable rope material formed by the foregoing fibers may be used.

FIGS. 23 to 26 show the process by which fastener strip 10 is formed, and the equipment used therein. It should be noted here that the basic process of manufacturing a resin-based fastener strip via an extruder and die/forming wheel combination is known in the art; accordingly, the entire process has not been illustrated, but rather that portion of the process relevant to the invention.

Figure 23:
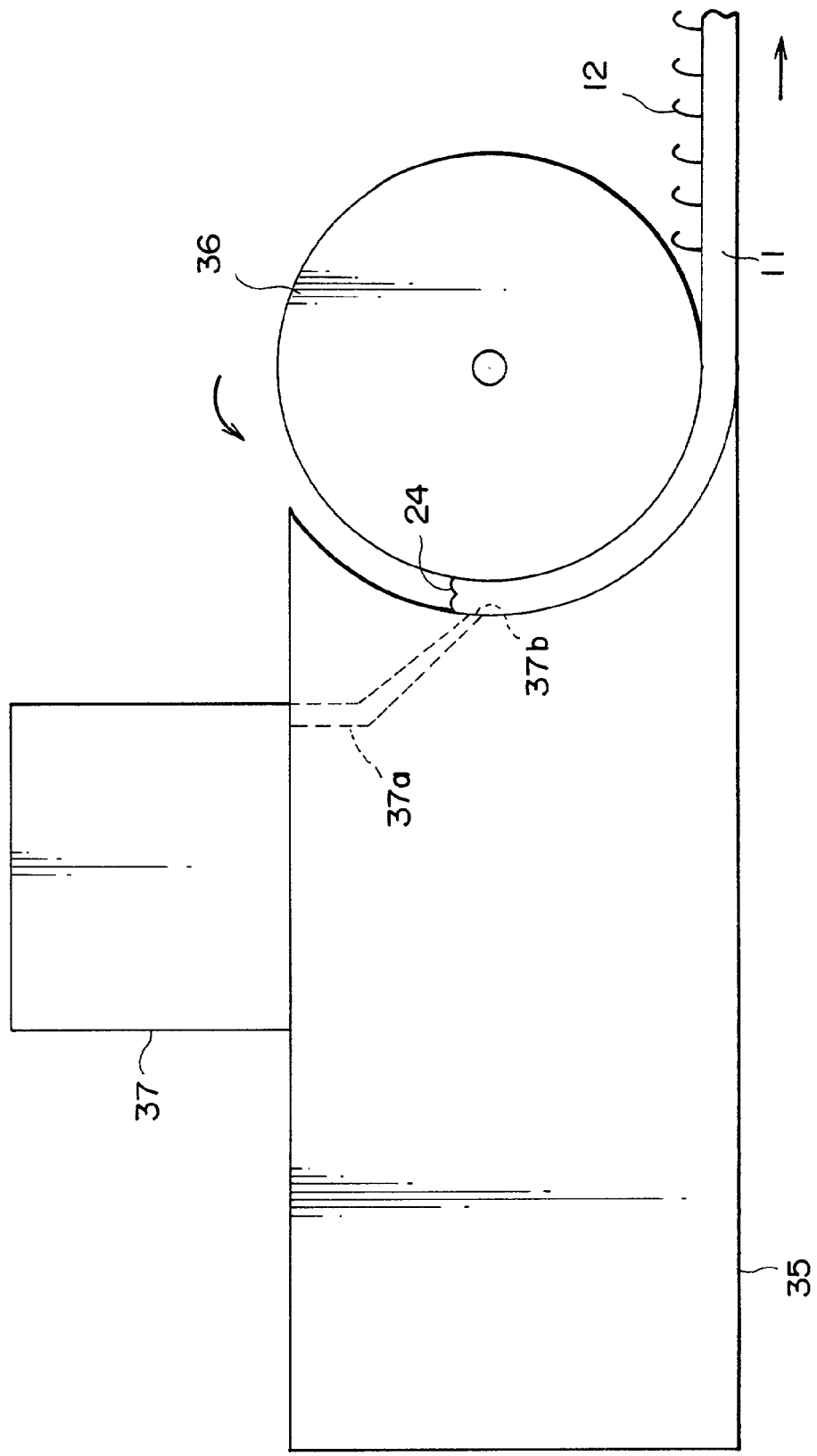
FIG. 23 is a side view of the fastener strip extrusion process, showing particularly the supplementary particle supply and supplementary particle nozzle.

FIG. 23 is a side view of the fastener strip extrusion process of the invention, wherein an extruder 35 is positioned adjacent to a die wheel 36. The die wheel 36 is cylindrical in shape, and has a plurality of hook-shaped cavities 36a for molding fastening elements 12 and a magnetically attractable body molding cavity 36b, both located around its outer circumference as further detailed in FIG. 26. The extruder 35 is elongated in shape, extends across the cylindrical breadth of the die wheel 36, and contains a series of primary channels (not shown) through which a resin 24 flows. A supplemental particle reservoir 37 is located on the top surface of the extruder 35. A supplemental particle channel 37a (indicated by hidden lines) connects the supplemental particle reservoir 37 to a supplemental particle nozzle 37b located on the face of the extruder 35 proximate to the die wheel 36.

Figure 24:
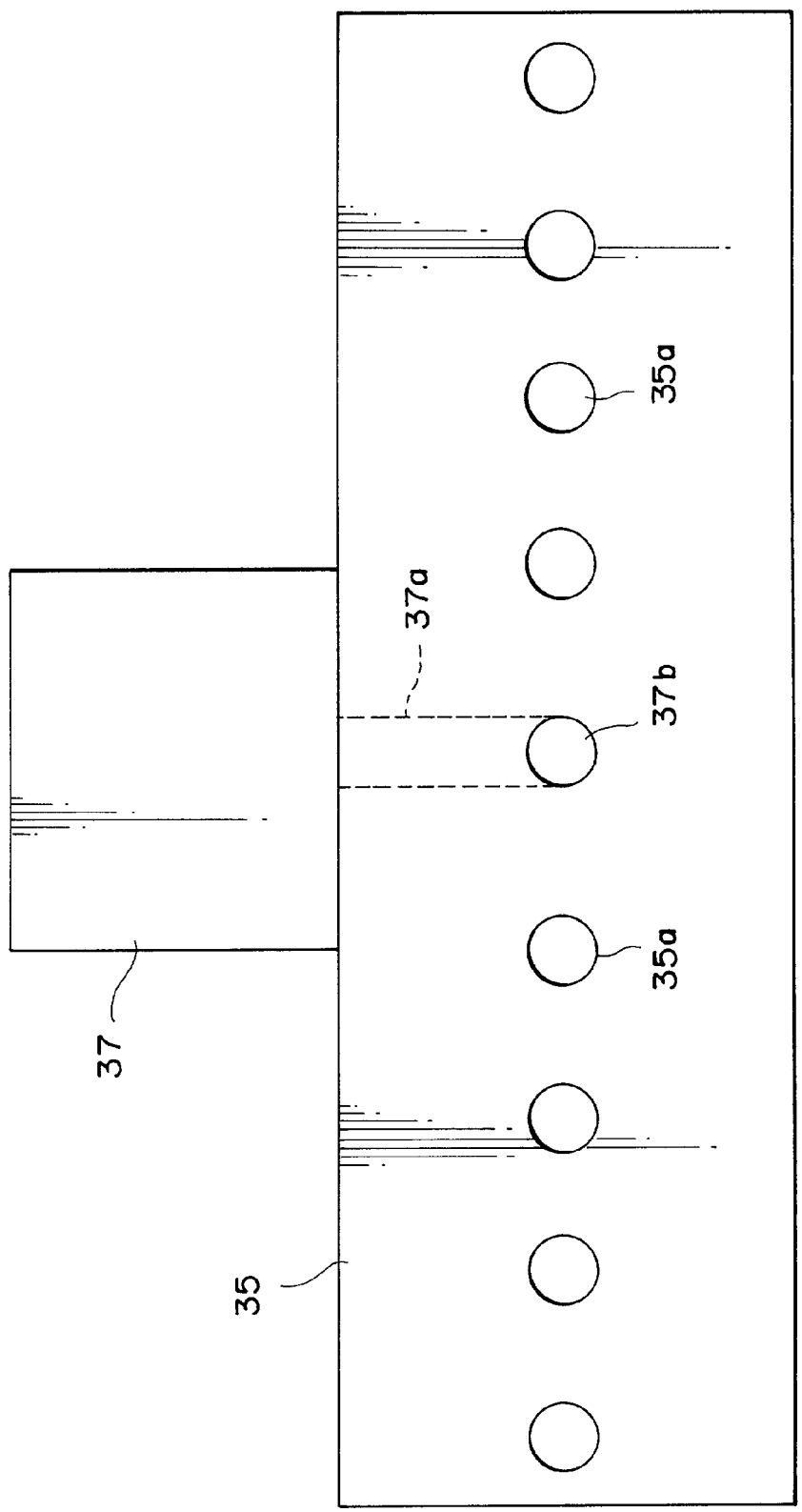
FIG. 24 is a front view of an extruder and a supplementary particle supply, illustrating the outlets of the primary and supplementary particle nozzles.
Figure 25:
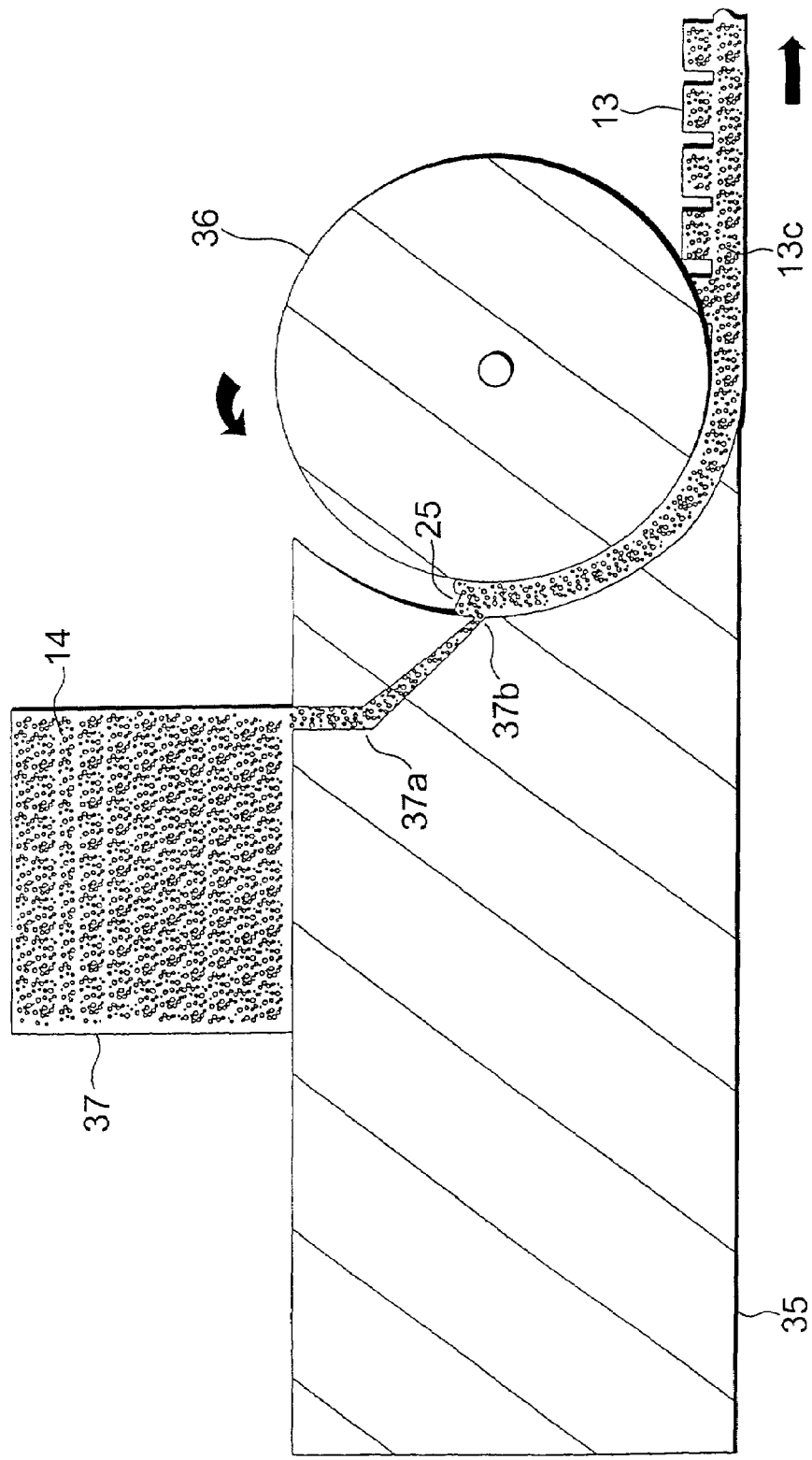
FIG. 25 is a further side view illustrating a fastener strip extrusion process in this view, the extruder and fastener strip have been cut away to show the discrete area having magnetically attractable particles.
Figure 26:
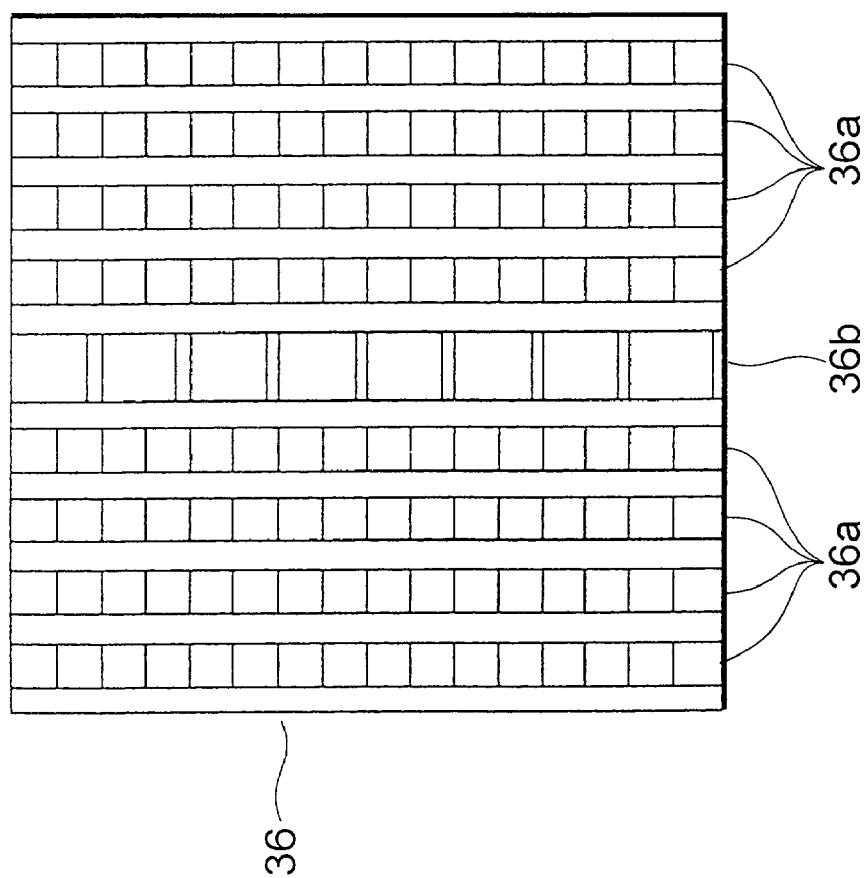
FIG. 26 is a front view of a die wheel, illustrating the hook forming cavities as well as the block forming cavity into which the magnetically attractable particles are introduced.

FIG. 24 is a front view of the die-wheel-proximate face of the extruder 35. A plurality of primary nozzles 35a extend across the extruding face of the extruder 16, and the supplementary particle nozzle 37b is located generally in the center of the extruding face of the extruder 35. Further, FIG. 23 illustrates the "piggyback" position of the supplemental particle reservoir 37 over the extruder 35, and the center position of the supplementary particle channel 37a within the extruder 35.

As shown in FIG. 23, the molten resin 24 is urged through the primary channels in the extruder 35 and consequently through the primary nozzles 35a. The die wheel 36 rotates counterclockwise in this view, and as the resin 24 is extruded through the primary nozzles 35a, the die wheel 36 acts with the lower front face of the extruder 35 to continuously form the fastener strip 10 having the base 11 and the hooks 12. Simultaneously, and as shown in the FIG. 25 cutaway view, a stream of the magnetically attractable resin 25 containing magnetically attractable particles 14 is urged from the supplementary particle reservoir 37 through the supplementary particle channel 37a and the supplementary particle nozzle 37b.

The supplementary particle nozzle 37b is aligned with the magnetically attractable body molding cavity 36b, such that the magnetically attractable resin 25 emerges from the supplementary particle nozzle 37b, forms a discrete portion of the base 11, and is also formed into block-shaped magnetically attractable bodies 13 on base 11 by the magnetically attractable body molding cavity 36b. It can be seen that while the magnetically attractable resin 25 becomes an integral part of the extruded fastener strip 10, the magnetically attractable particles 14 remain in a discrete area, and are not dispersed generally throughout the base 11. The fastener strip 10, having a discrete, targeted magnetically attractable area, is thereby continuously formed and withdrawn from the bottom periphery of the die wheel 36.

Figure 27:
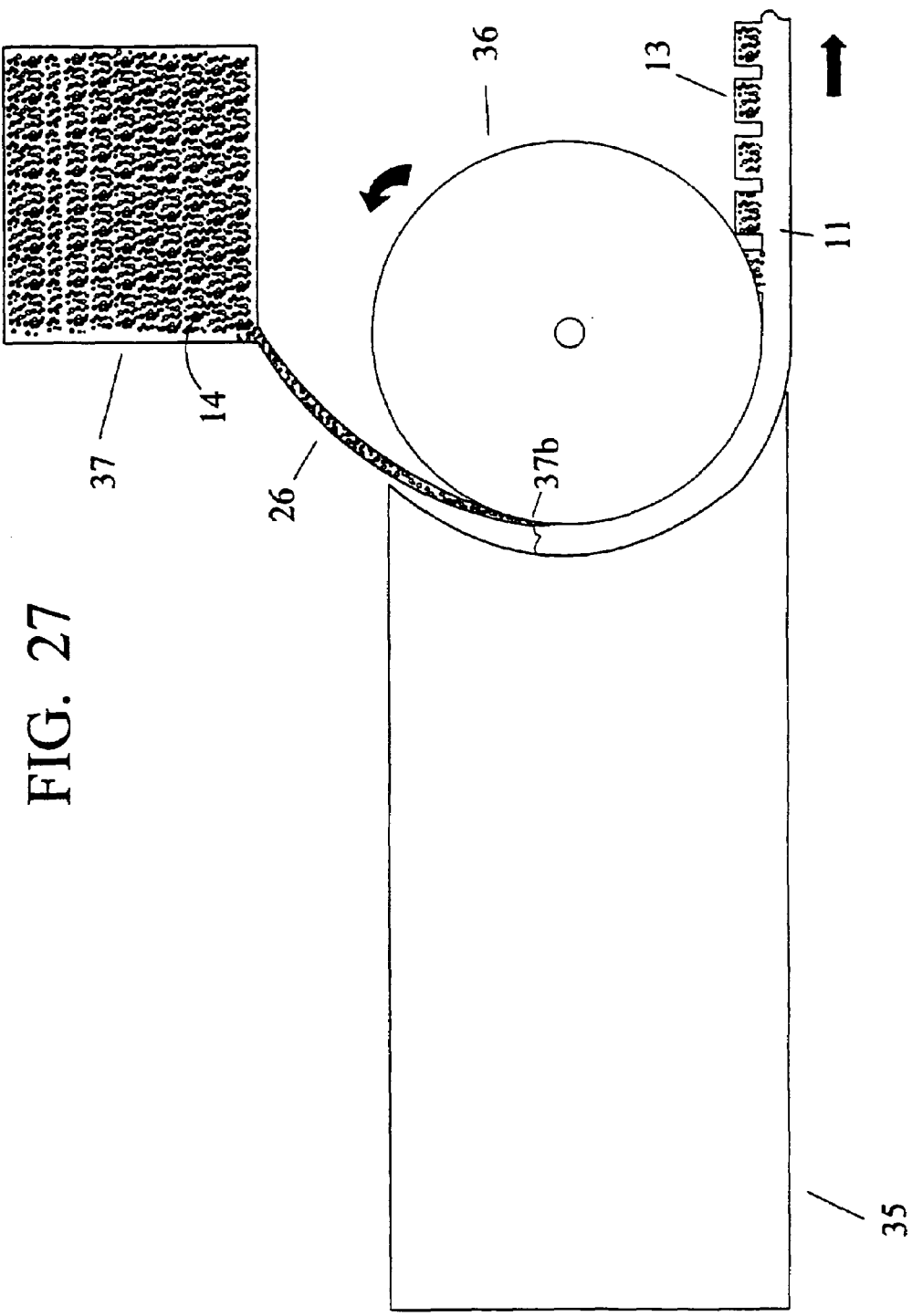
FIG. 27 is a side view partially in cross section of another process embodiment, wherein the magnetically attractable particles are introduced proximate to the block forming cavity in the die wheel.

FIG. 27 is a side view of an alternative process embodiment partially in cross section, wherein the magnetically attractable particles 14 are introduced directly into the magnetically attractable body molding cavity 36b, instead of passing through the extruder 35 as in the main embodiment. In this embodiment, the supplementary particle reservoir 37 is placed in any suitable location, and the stream of the magnetically attractable resin 25 is conveyed through a line 26 to the die wheel 36, in the area of the magnetically attractable body molding cavity 36b. As in the main process embodiment, it can be seen that while the magnetically attractable resin 25 becomes an integral part of the extruded fastener strip 10, the magnetically attractable particles 14 remain in a discrete area, and are not dispersed generally throughout the base 11. Other process steps are the same as in the main embodiment.

Figure 28:
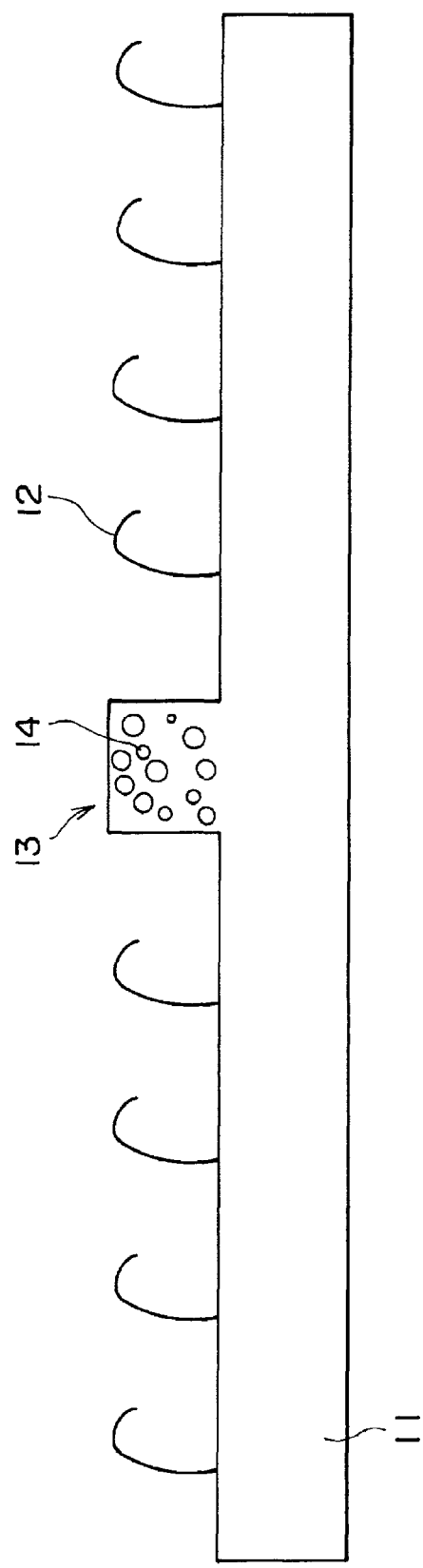
FIG. 28 is a cutaway end view of an example fastener strip produced by the process embodiment of FIG. 27, wherein the magnetically attractable particles are only within the center blocks, and not the base underlying the center blocks.

FIG. 28 is a cutaway end view of an example fastener strip produced by the alternative process embodiment of FIG. 24. In this example, the magnetically attractable particles 14 are only within the center magnetically attractable body 13, and not within the base underlying the center magnetically attractable body 13. However, it can be appreciated that by varying the flow rate of the magnetically attractable resin 25 in relation to the flow rate of the resin 24, the rotational speed of the die wheel 36, and the proximity of the outlet of line 26 to the magnetically attractable body molding cavity 36b, one can control the extent of magnetically attractable particles 14 in the base 11 and in any member molded with and carried on the base 11. Thus, while FIG. 28 shows an example with the magnetically attractable particles only within the center magnetically attractable body 13, and not within the underlying base 11, certainly the alternative process embodiment of FIG. 27 can also produce a fastener strip like that shown in FIG. 2, wherein the magnetically attractable particles 14 are within both the center magnetically attractable body 13 and the underlying base.

A method of manufacturing a fastener strip manufacturing apparatus as well as the manufacturing apparatus thereof will be further specifically explained below, by describing other embodiments based on the above described various modifications with reference to the drawings below.

Figure 29A:
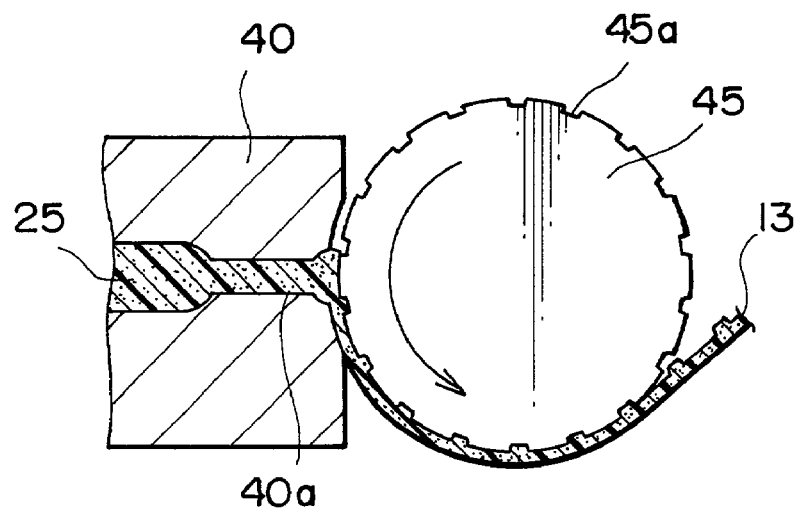
FIGS. 29A and 29B are cross sectional views illustrating an arrangement of an extruding die, a material guiding opening and a die wheel.
Figure 29B:
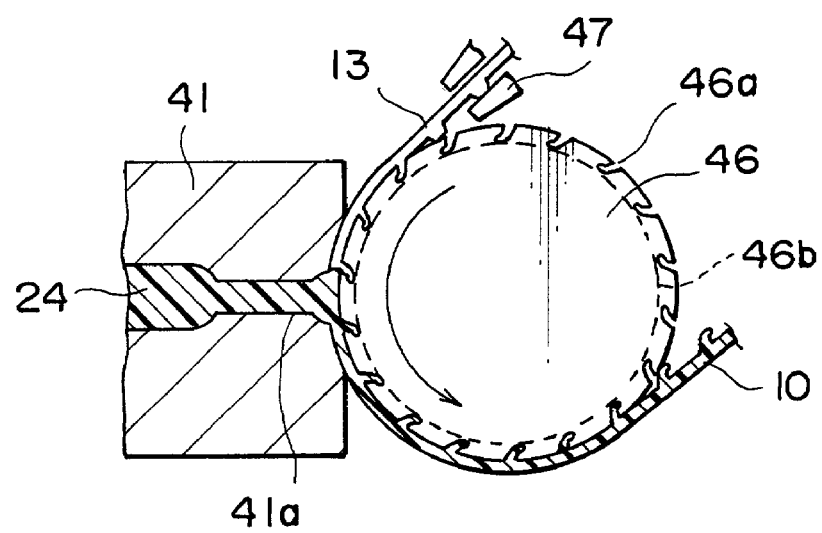
Figure 30:
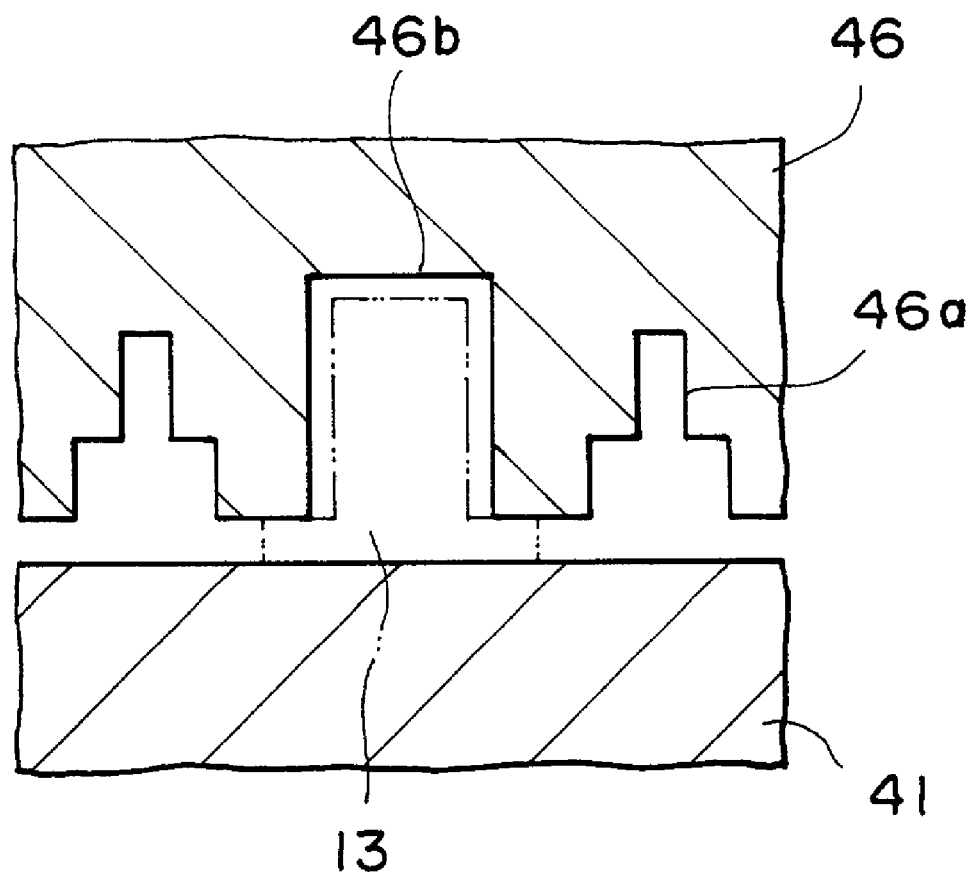
FIG. 30 is a partial cross sectional view for illustrating a magnetically attractable body molding cavity and a fastener strip molding cavity.

FIGS. 29A, 29B and 30 illustrate a fastener strip manufacturing apparatus and a method of manufacturing the fastener strip of the invention FIGS. 29A and 29B show that the fastener strip can be manufactured in two steps. As shown in FIG. 29A, a first die wheel 45 is located opposite an extruding opening 40a of a first extruding die 40. The first die wheel 45 is rotated around a rotational axis in a vertical direction with respect to the paper surface in FIG. 19. A magnetically attractable body molding cavity 36b is located on the rotation peripheral surface of the first die wheel 45. Concave protrusion-molding portions 45a, having a narrow shape and being intermittently spaced in a peripheral direction, are formed as part of magnetically attractable body molding cavity 36b.

A clearance is defined between the first extruding die 40 and the first die wheel 45, and the base material portion 13c of the magnetically attractable body 13 as shown in FIG. 6 is molded by this clearance. Alternatively, the concave protrusion-molding portions 45a may be continuous in the peripheral direction of the first die wheel 45, such that a continuous protrusion 13a is molded.

In FIG. 29B, a second die wheel 46 is located opposing to an extruding opening 41a of a second extruding die 41. Second die wheel 46 is rotated around a rotational axis perpendicular to the paper surface in FIG. 29B. A fastener strip molding cavity 46a is located on the rotation peripheral surface of the second die wheel 46.

As shown in FIG. 30, fastener strip molding cavity 46a can include concave portions for molding fastening elements located at a predetermined pitch in a peripheral direction; concave portions for molding a base; concave portions for accommodating magnetically attractable body 46b; and concave portions for molding other parts [for example, concave portions of a barrier to prevent the intrusion of a molding material and a vertical sealing member or the like (not illustrated)].

In FIG. 29A, the molten magnetically attractable resin material 25 located within the first extruding die 40, in which the magnetically attractable particles are mixed, is extruded from the extruding opening 40a, so that the molten magnetically attractable resin material 25 continuously fills the magnetically attractable body molding cavity 36b of the first die wheel 45 rotating around the horizontal axis. Then, the magnetically attractable body 13 having the protrusion 13a and the base material portion 13c is peeled off from the first die wheel 45.

In FIG. 29B, the molten synthetic resin material 24 located within the second extruding die 41 is extruded from the extruding opening 41a, so that the molten synthetic resin material 24 continuously fills the fastener strip molding cavity 46a of the second die wheel 46 rotating around the horizontal axis. Simultaneously, the magnetically attractable body 13 molded before, is continuously supplied to the concave portions for accommodating the magnetically attractable body 46b via the magnetically attractable body guiding portion 47. The molded fastener strip 10 including the base 11, the fastening elements 12 and the protrusions 13a is peeled off from the second die wheel 46. Then, the manufactured fastener strip 10 is cut to a deed length for use.

According to an example shown in FIG. 30, the cross section shape of the concave portion for accommodating the magnetically attractable body 46b, formed in the second die wheel 46, is larger that that of the magnetically attractable body 13, which is separately molded. Therefore, at least the surface of the magnetically attractable body 13 is coated by the resin 24 used for molding the rest of the fastener strip 10. As a result, even when the resin used for the magnetically attractable body 13 and the resin used for the fastener strip 10 have poor affinity, it is possible to avoid separation of the magnetically attractable body 13 from the rest of the fastener strip 10.

Figure 31A:
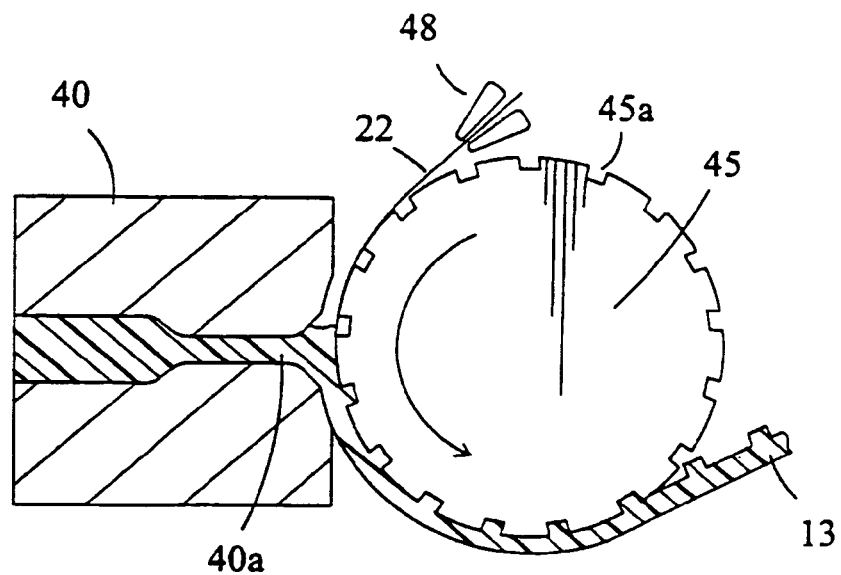
FIGS. 31A and 31B are views, in which a guiding portion provides a long magnetically attractable material in the form of a metal wire.
Figure 31B:
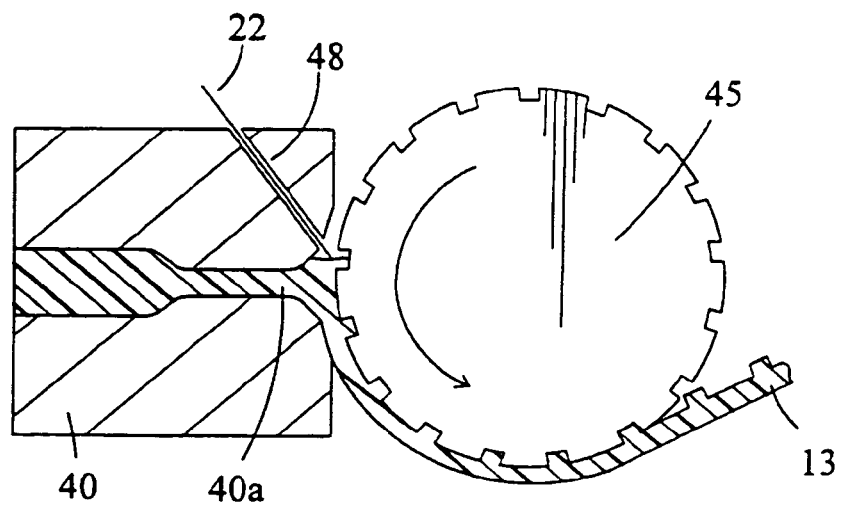

According to the example shown in FIGS. 29A and 29B, the molten magnetically attractable resin 25 is extruded from the extruding opening 40a of the first extruding die 40. However, as shown in FIGS. 31A and 31B, it is also possible to manufacture the fastener strip 10 in such a manner that the synthetic resin material 24, in which the magnetically attractable particles are not mixed, is extruded from the extruding opening 40a, and a separately prepared long magnetically attractable material 22 is guided via a magnetically attractable body guiding portion 48 to mold the magnetically attractable body 13. The molded magnetically attractable body 13 is then supplied through the magnetically attractable body guiding portion 47 located upstream in the rotational direction of the second die wheel 46 shown in FIG. 29B.

FIG. 31A illustrates a structure such that the magnetically attractable body guiding portion 48 is provided outside of the first extruding die 40 and FIG. 31B illustrates an example such that the magnetically attractable body guiding portion 48 is formed inside of the first extruding die 40. Other component parts are the same as those in FIG. 29A.

Figure 32A:
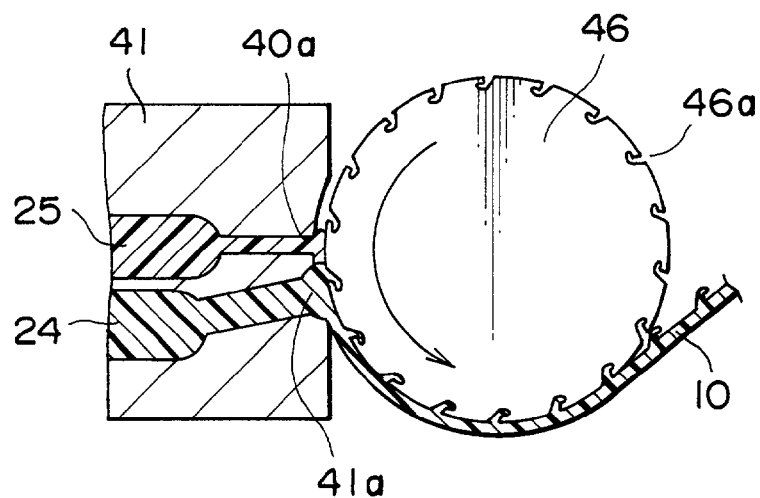
FIG. 32A is a cross sectional view for illustrating an arrangement of an extruding die of which a vertical pair of extruding openings are provided, a die wheel and a material guiding opening.
Figure 32B:
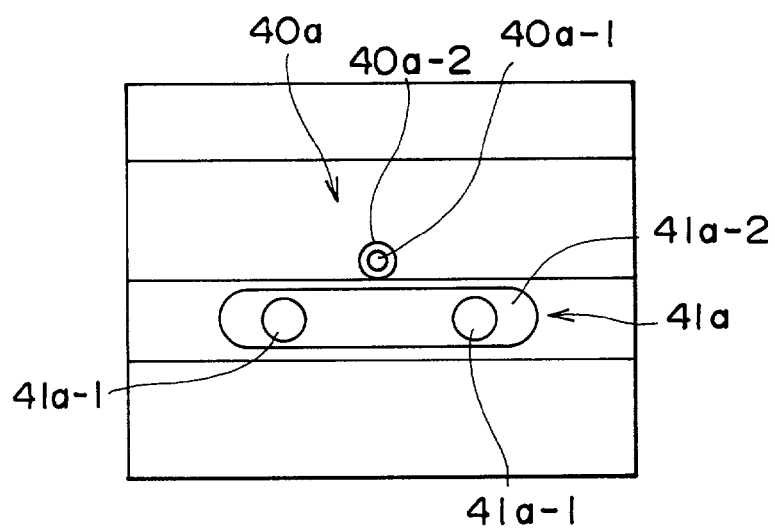
FIG. 32B is a partial front view illustrating an extruding opening of the extruding die.

An example shown in FIGS. 32A and 32B is different from the cases shown in FIGS. 28 through 31. In FIGS. 32A and 32B, the fastener strip 10 is manufactured in one step. In this embodiment, only the second extruding die 41 is used, and the fastener strip 10 having the magnetically attractable body is thus manufactured in one step.

The positional relationship between the second extruding die 41 and the die wheel 46 in FIGS. 32A and 32B is the same as that shown in FIGS. 29A and 29B, except that the extruding openings 40a and 41a are provided on the upper and lower positions of the second extruding die 41. The explanation for that portion of FIGS. 32A and 32B is therefore omitted.

As further shown in FIG. 32A, the two extruding openings 40a and 41a provided on the second extruding die 41 are capable of extruding the different synthetic resins, respectively. As shown in FIG. 32B, at a front end of the extruding opening 40a, an extruding nozzle portion 40a-1 and a concave portion 40a-2 are formed. This concave portion 40a-2 is formed so that it is possible to continuously fill the molten magnetically attractable resin 25, in which the magnetically attractable particles are intensively mixed, into the narrow shaped concave protrusion-molding portions 45a to mold the magnetically attractable body 13, which is continuous in a peripheral direction or is formed of intermittently spaced protrusions 13a, from the extruding opening 40a As a result, the magnetically attractable resin 25 extruded from the extruding nozzle portion 40a-1 specifically fills the concave protrusion-molding portions 45a, so that it is possible to prevent the magnetically attractable resin 25 from filling the concave fastener strip molding cavity 46a located adjacent thereto.

The lower extruding opening 41a can be placed in any location suitable to correspond with concave portions associated with the fastener strip molding cavity 46a defined in the die wheel 46—for example, a concave portion for a projection, a concave portion for a fastening element 12 and the like. Further, the extruding nozzle portion 41a-1 and the concave portions 41a-2 located at the periphery thereof are formed at a front end of the extruding opening 41a. The synthetic resin material 24 extruded from the extruding nozzle portion 41a-1 expands into the concave portions 41a-2, so that it is possible to continuously fill the synthetic resin material 24 across the whole surface of the fastener strip molding cavity 46a.

Then, the molten magnetically attractable resin 25 is extruded from the extruding opening 40a to continuously fill the magnetically attractable body molding cavity 36b. Therefore, the magnetically attractable body 13 is manufacture. Simultaneously, the molten resin 24 is extruded from the extruding opening 41a to continuously fill the fastener strip molding cavity 46a. By filling the synthetic resin 24 from the extruding opening 41a, it is possible to form the magnetically attractable body 13, made of the magnetically attractable resin material 25 extruded from the extruding opening 40a, on the base 11 in an integral manner so as to be superposed on the base 11, as shown in FIG. 13. Alternatively, as shown in FIG. 6 and FIG. 17, it is also possible to continuously fill the synthetic resin 24 in such a manner that the magnetically attractable body 13 and the base 11 are connected in a strip width direction.

After filling the synthetic resin 24, a continuous fastener strip is obtained by peeling fastener strip 10 off from the die wheel 46. It is possible to then cut this continuous fastener strip to a desired length for use.

Figure 33:
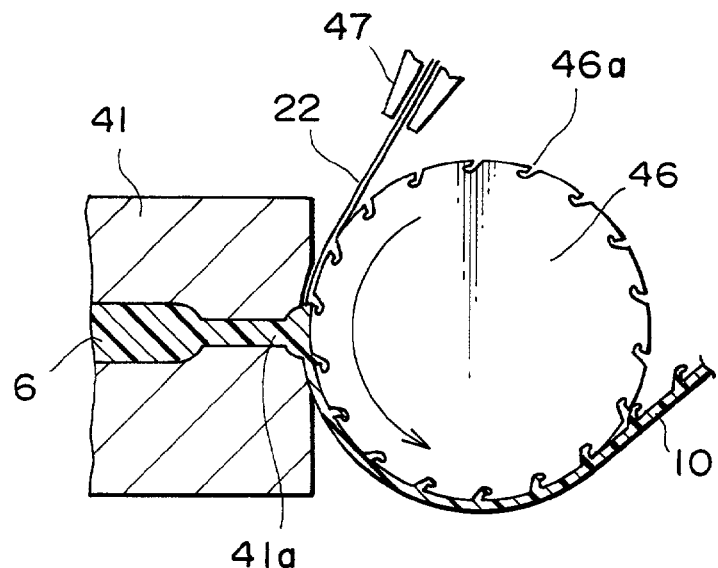
FIG. 33 is a view, in which a guiding portion provides a long magnetically attractable material in the form of a metal wire.
Figure 34:
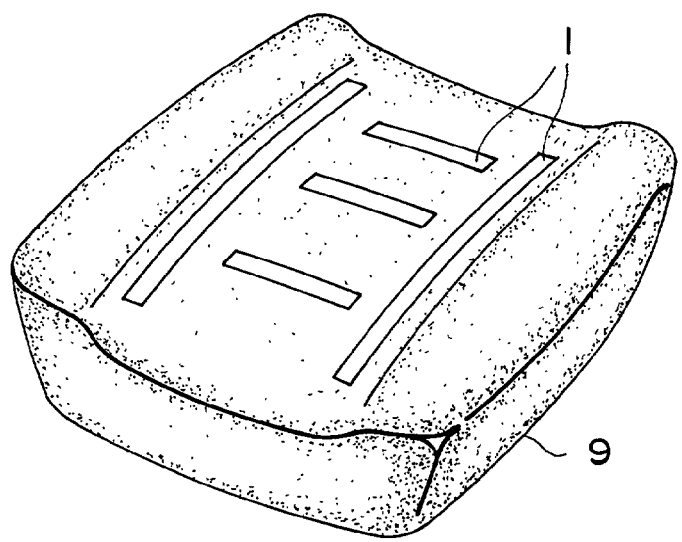
FIG. 34 is a perspective view of a cushion body having a fastener strip fixed thereon in an integral manner.

As shown in FIG. 33, the synthetic resin 24, in which the magnetically attractable particles are not mixed, can be extruded from the extruding opening 40a to fill both the fastener strip molding cavity 46a and the concave portion for accommodating the magnetically attractable body 46b. By continuously supplying the long magnetically attractable material 22 from the magnetically attractable body guiding portion 47, a magnetically attractable body 13 is provided in which the long magnetically attractable material 22 is embedded in the protrusion 13a. After that, the completed fastener strip 10 is peeled from the die wheel 46.

Additionally, according to a structure shown in FIG. 23, the fastener strip 10 can be molded without providing the long magnetically attractable material 22, and the magnetically attractable material can be later laminate-processed or coating-processed at least on the top of the protrusion 13a in the previously-molded fastener strip 10, so as to form the magnetically attractable body 13.

A molding cavity structure can also be anticipated wherein the concave protrusion-molding portions 45a are formed at even intervals on a peripheral direction of the peripheral surface of the die wheel and also along a direction of the rotational axis of the die wheel. It is possible to manufacture the fastener strip by using such a molding cavity, however, the continuously molded fastener strip must be cut between the adjacent protrusions to manufacture the fastener strip. In addition, the above described magnetically attractable layer or coating may be applied at least on the top surfaces of the protrusions after cutting the fastener strip or before cutting the fastener strip.

According to the examples shown in FIGS. 29A, 29B to 33, the apparatus and the manufacturing method of any fastener strip may be applied if it is within the range of a typical example and does not deviate from the object of the present invention.

CONCLUSIONS, RAMIFICATIONS, AND SCOPE

Thus the reader will see that this invention provides a very effective way to incorporate magnetically attractable particles into specifically targeted areas of a fastener strip. While the above descriptions contain many specificities, these shall not be construed as limitations on the scope of the invention, but rather as exemplifications of embodiments thereof. Many other variations are possible.

Examples of just a few of the possible variations follow:

The supplemental particle reservoir does not have to be located above the extruder in a "piggyback" fashion as in the main embodiment. It may be located in any suitable location, and a line or tube used to convey the magnetically attractable particles to the supplementary particle channel.

There can be many different ways to urge the magnetically attractable particles, or a resin containing such particles, from a reservoir through a channel or line to a nozzle or line outlet. Such techniques are known in the art, and include conveyance by way of air or hydraulic pressure, gravity, or other means.

The steam of magnetically attractable particles can travel through its own dedicated channel in the extruder, as in the main embodiment, or can "join" one of the other channels in the extruder, upstream from the nozzle.

The magnetically attractable body can be incorporated into a discrete area of a substrate which is formed with the base or formed separately. In this case, the substrate would effectively be a part of the base.

In addition to the above-mentioned, the magnetically attractable particles can include, but are not limited to, all ferro-magnetically attractable materials, including iron particle, various forms of iron oxide, iron stearate, various organo-ion compounds, rare-earth metals and rare-earth metal compounds, or any other magnetically attractable material.

In addition, it should be understood that the magnetically attractable particles can themselves be magnetically attractive—that is, be magnets themselves. This would allow the fastener strip to be secured to metal or other magnetically attractable objects which are not magnets themselves.

The magnetically attractable particles can be premixed into a resin, or they can be "loose" particles which are conveyed down into a resin stream.

The shape of the discrete magnetically attractable body can be different than the protrusion, fastening element, and wall shown, and as just an example, square cubes can also be used. In addition, of course, magnetically attractable particles can be incorporated into a discrete area of the base only. In this case, the discrete area of the base can be substantially flat, without having any members overlying it, or it can alternatively have members overlying it.

The fastening elements carried on the base, and/or incorporated with magnetically attractable particles, can be different than the hook fasteners shown in the drawings—as just one example, they can be loop fastening elements instead. Indeed, other types of fastening or engaging elements—not just hooks or loops—can also be used.

The magnetically attractable bodies can be incorporated into the discrete areas at any location on the fastener strip, not just the center location shown in the main embodiment and the side locations shown in FIG. 3. For example, the supplementary particle nozzle can be positioned on the face of the extruder adjacent to a hook forming cavity, so that magnetically attractable hook members are formed on the base of the fastener strip. A similar result can be obtained, in the alternative process embodiment, by positioning the outlet of the line proximate to a hook forming cavity.

Supplementary particle nozzles can be placed in multiple locations on the face of the extruder, and line outlets can be placed in multiple locations proximate to the die wheel—rather than having just one supplementary particle nozzle or one line outlet as in FIGS. 23,24,25, and 27. Indeed, the fastener strip shown in FIG. 3 results from such a multiple placement.

The magnetically attractable particles can be introduced into the resin stream in a discrete area immediately above the resin as it emerges from the primary nozzles, rather than via the supplementary particle nozzle as in the FIG. 23 main embodiment or directly into the magnetically attractable body molding cavity as in the FIG. 27 alternative embodiment.

Accordingly, the scope of the present invention should be determined not by the embodiments shown, but by the attached claims and the legal equivalents thereof.

The invention claimed is:

1. A fastening device comprising:
  (a) a base;
  (b) at least one fastening element disposed on a surface of the base; and
  (c) a magnetically attractable body disposed on the surface of the base on which the at least one fastening element is disposed, the magnetically attractable body having an elongated shape in a longitudinal direction of the base;
  wherein the magnetically attractable body is provided in line in the longitudinal direction of the base, and
  wherein the magnetically attractable body disposed on the base is configured by at least one continuous row of synthetic resin protrusions including magnetically attractable material, and
  wherein the fastening device can be magnetically secured to an object, and
  wherein the protrusions are configured in such a manner that valley portions are formed at predetermined intervals along the longitudinal direction of the base, and
  wherein a long magnetically attractable material is exposed on said valley portions of the protrusions.

* * * * *